(12) United States Patent
Lipman et al.

(10) Patent No.: US 12,524,738 B2
(45) Date of Patent: Jan. 13, 2026

(54) DOCUMENT CREATION SYSTEM AND METHOD USING ENCRYPTION TECHNOLOGY

(71) Applicant: Docuvisory LLC, Jericho, NY (US)

(72) Inventors: Robert Lipman, Jericho, NY (US); Allison Plesur, Jericho, NY (US); Aashish Shrestha, Henrico, VA (US); Mohan Venkataraman, Cary, NC (US)

(73) Assignee: Docuvisory LLC, Jericho, NY (US)

( * ) Notice: Subject to any disclaimer, the term of this patent is extended or adjusted under 35 U.S.C. 154(b) by 28 days.

(21) Appl. No.: 16/832,615

(22) Filed: Mar. 27, 2020

(65) Prior Publication Data

US 2020/0311688 A1    Oct. 1, 2020

Related U.S. Application Data

(60) Provisional application No. 62/827,000, filed on Mar. 30, 2019.

(51) Int. Cl.
*G06F 16/182* (2019.01)
*G06F 16/176* (2019.01)
(Continued)

(52) U.S. Cl.
CPC ..... *G06Q 10/1053* (2013.01); *G06F 16/1774* (2019.01); *G06F 16/1837* (2019.01);
(Continued)

(58) Field of Classification Search
CPC ....... G06Q 10/1053; G06Q 10/063114; G06Q 10/067; G06Q 10/10; G06Q 2220/00; G06F 16/1837; G06F 16/1774; H04L 9/0637
(Continued)

(56) References Cited

U.S. PATENT DOCUMENTS 7,783,885 B2    8/2010    Dietl
7,865,451 B2    1/2011    Hyder et al.
(Continued)

FOREIGN PATENT DOCUMENTS

JP    2019169122 A    *  10/2019
WO    2009143494 A1    11/2009
(Continued)

*Primary Examiner* — Tuyetlien T Tran
(74) *Attorney, Agent, or Firm* — Dilworth & Barrese, LLP

(57) ABSTRACT

A system and method for document creation, documentation, storage and deletion using blockchain technology features a user computational device and enterprise HR Application communicating with an application server through a computer network. The application services direct which service to initiate based on instructions from the user computational device and enterprise HR application. A user can log into the system, creates a draft document by filing out a template, and optionally attach supporting materials. The system then starts an approval process until an approved and finalized document is created and added to the blockchain. All drafts are then permanently eliminated. Permanent records of the specific documents received by specific users can also be immutably created. The system provides powerful search capabilities that are customizable to the user's needs.

12 Claims, 38 Drawing Sheets

(51) Int. Cl.
  *G06Q 10/0631* (2023.01)
  *G06Q 10/067* (2023.01)
  *G06Q 10/10* (2023.01)
  *G06Q 10/1053* (2023.01)
  *H04L 9/06* (2006.01)

(52) U.S. Cl.
  CPC ... *G06Q 10/063114* (2013.01); *G06Q 10/067* (2013.01); *G06Q 10/10* (2013.01); *H04L 9/0637* (2013.01); *G06Q 2220/00* (2013.01)

(58) Field of Classification Search
  USPC ........................................................ 715/229
  See application file for complete search history.

(56) References Cited

U.S. PATENT DOCUMENTS

| | | | | |
|---|---|---|---|---|
| 9,396,202 | B1* | 7/2016 | Drobychev | G06F 16/178 |
| 10,108,812 | B2* | 10/2018 | Ansari | G06F 21/6209 |
| 10,678,866 | B1* | 6/2020 | Ranganathan | G06F 40/197 |
| 10,685,140 | B2* | 6/2020 | Barday | H04L 63/108 |
| 2007/0050238 | A1* | 3/2007 | Carr | G06Q 10/10 |
| 2011/0196829 | A1* | 8/2011 | Vickrey | G06F 16/275 |
| | | | | 707/622 |
| 2012/0303865 | A1* | 11/2012 | Hars | G06F 12/0246 |
| | | | | 711/E12.008 |
| 2014/0298207 | A1* | 10/2014 | Ittah | G06Q 10/00 |
| | | | | 715/753 |
| 2014/0317049 | A1* | 10/2014 | DeRoller | G06Q 10/103 |
| | | | | 707/608 |
| 2015/0199911 | A1* | 7/2015 | Paramoure | G09B 5/00 |
| | | | | 434/350 |
| 2016/0292154 | A1* | 10/2016 | Campbell | G06F 16/93 |
| 2017/0046651 | A1 | 2/2017 | Lin et al. | |
| 2018/0082256 | A1 | 3/2018 | Tummuru et al. | |
| 2018/0173719 | A1 | 6/2018 | Bastide et al. | |
| 2018/0174255 | A1 | 6/2018 | Hunn et al. | |
| 2018/0218455 | A1 | 8/2018 | Kolb et al. | |
| 2018/0240552 | A1* | 8/2018 | Tuyl | G16H 50/20 |
| 2018/0293547 | A1 | 10/2018 | Randhawa | |
| 2018/0336520 | A1* | 11/2018 | Davis | G06Q 10/1097 |
| 2019/0026485 | A1* | 1/2019 | Ansari | G06F 21/602 |
| 2019/0327080 | A1* | 10/2019 | Liu | H04L 9/0891 |
| 2021/0012289 | A1* | 1/2021 | Hsieh | H04L 65/403 |

FOREIGN PATENT DOCUMENTS

| | | | | |
|---|---|---|---|---|
| WO | 2017145021 | A1 | 8/2017 | |
| WO | 2018100227 | A1 | 7/2018 | |
| WO | WO-2019125400 | A1 * | 6/2019 | ............ G06F 21/32 |

* cited by examiner

AI system details

DOCUMENT CREATION SYSTEM AND METHOD USING ENCRYPTION TECHNOLOGY

CROSS REFERENCE TO RELATED APPLICATIONS

This application claims the benefit as a Continuation-in-Part of Provisional Application Ser. No. 62/827,000, filed Mar. 30, 2019, the entire contents of which are incorporated herein by reference.

BACKGROUND OF THE INVENTION

The invention relates generally to a system and method for document and documentation creation, storage and management, and in particular, to such a system and method facilitating the creation, communication and management of documents, particularly in the employment/human resources context.

Many companies find it complicated to manage communication between their Human Resource (HR) departments and employees and to document HR generated documentation concerning the employees. Some businesses have complicated and not well enacted systems in place. Others do not have any systems in place. In addition, many companies rely on email to transmit important intra-company communications. The email servers often delete all emails after a certain date and often overwrite deleted content of the email server, causing issues with retrieval and evidence that a document was received and reviewed.

Another issue plaguing HR departments is supervisors who are charged with creating employee performance documentation, but are not be adequately trained to create effective, legally appropriate and objective documents. In addition, businesses experience issues of privacy, confidentiality, and control of the information HR and non-HR employees can access.

Accordingly, there is a need for a system and method for document and documentation creation, communication, management and verification of documents as pertaining to the employment context.

SUMMARY OF THE INVENTION

Generally speaking, in accordance with the invention, a system and method are provided for effectively creating documents and securely communicating those documents to personnel. The system is preferably computer implemented and can be web or server based. It can employ a user computational device such as an employee computer work station or a remote work station and can include an enterprise HR application that communicates with an application server through a computer network (i.e., internet). Both the user computational device and enterprise HR application can use an application program interface (API) with graphical user interface (GUI) components to interact with the application server. An API is a set of routines, protocols, and tools for software applications and helps specify how software components should interact.

The application server features application services, an application API, a blockchain API, a Document Creation node, an Employer 1 Node, an Employer 2 Node, and/or other components. The application services direct which service to initiate based on instructions from the user computational device and enterprise HR application. Optionally, the application server also features an artificial intelligence (AI) system for analyzing, commenting, and editing documents into the most appropriate format with the most appropriate wording, such as by highlighting or deleting inappropriate words and/or suggesting preferred language.

One method for creating documents and securely communicating those documents in accordance with the invention is described below. The users (i.e., employees and contractors) are all assigned an identifier, such as a unique email address and those addresses are associated with one or more credential levels, such as "Employee", "Contractor", "Administrator", "Supervisor", "Reviewer" or "HR reviewer", "HR" and/or "Hotline Recipient".

A supervisor can log into the Document Creation system and create a "draft" document concerning an employee/contractor, preferably from a list of templates, and can optionally attach supporting materials. The document can be documentation of conduct or performance such as a performance review, a performance evaluation, an absenteeism/lateness report, a violation report, etc. The document is preferably encrypted with a unique encryption key and stored on a specific location on the system, referred to as a "container". After the supervisor saves the draft document, the system notifies a reviewing user whose email address is associated with the title "reviewer," that a draft document is ready for review.

When the reviewer logs into the system, the reviewer can see that a draft document is available for review. The reviewer can be a third party, e.g., a contractor or employee of the employer. The reviewer can then open and review the draft document, and then either approve or reject the draft document. If the reviewer rejects the draft document, the reviewer can coach the supervisor to produce a more effective document by editing, asking questions, and/or adding comments to the draft document. These edits, comments or questions are returned with the draft to the supervisor. When the review by the reviewer is completed, the Document Creation system will notify the supervisor that the draft document requires the supervisor's attention.

In preferred embodiments of the invention, when the supervisor reviews their home page of the Document System, they will see that the draft document requires their attention. After the supervisor accepts or rejects the reviewer's edits, responds to questions and comments, and/or asks questions, the supervisor resubmits the draft to the reviewer. The system then notifies the reviewer that the draft document is again ready for their new review. This process is repeated until the supervisor has created a document that is "Approved" by the reviewer. However, the document is still considered a draft.

In preferred embodiments of the invention, after the reviewer approves the draft document, the system sends an email to the HR reviewer that a reviewer has approved a draft document and that the draft requires their attention. An HR reviewer is a user with HR status who has been designated by the employer to review and finalize draft performance documents.

There can be multiple users with HR status. In addition to whatever access those users have through other roles they hold, HR users can see, search for, retrieve and download all finalized documents for the employer. The HR reviewer a role is a position that preferably is held by only one single user for each employer. Certain large and/or diverse employers may decide to have more than one HR reviewer. The HR reviewer must also hold an HR role, and they can be any employee or a contractor, such as outside counsel.

When the HR Reviewer is notified that the draft document requires their attention, they can log into the system, open, and review the draft document. The HR reviewer can then either approve or reject the draft document that was previously approved by the reviewer. If the HR reviewer does not approve the draft document, the HR reviewer can edit, ask questions, and add comments to the draft document in the same manner in which the reviewer did so, as discussed above. In that case, after making edits, the HR reviewer would send the draft back to the supervisor for revision. Thereafter, the system notifies the supervisor that the draft document once again requires the supervisor's attention.

The supervisor can then accept or reject the HR reviewer's edits, respond to questions or comments, and/or ask questions, as they did with the reviewer's, as described above. The supervisor can thensend the draft back to the HR reviewer. The system then notifies the HR reviewer that the draft document is again ready for their review. This process is repeated until the HR reviewer is satisfied with the draft document and "approves" it, finalizing it. At this point, all drafts are deleted and the encryption key for that draft is also deleted. The drafts are irretrievably deleted.

In preferred embodiments of the invention, after the HR reviewer approves the draft document, the Document Creation system can add the approved document to the blockchain to make it retrievable and immutable. Once the draft is approved, the HR reviewer can then select one of the following distribution options: (1) users who are the subject of the document (e.g., the worker about whom the document was written) can have the opportunity review the document; (2) those users who are the subject of the document can have the opportunity to both review and respond to the document; and (3) those users who are the subject of the document cannot review the document. If the HR reviewer selects option 1, then the employee/contractor receives a notification (email) that a document requires their attention. The employee/contractor can then log into the system, open the document, and acknowledge receipt of the document. The employee/contractor's acknowledgment of receipt of the document can be added to the blockchain.

If the HR reviewer selects option 2, the employee/contractor can both review the document and respond to it. In preferred embodiments of the invention, the employee/contractor would first receive a notification (email) that a document requires their attention. The employee/contractor can then log into the system, open the document and acknowledge receipt of the document. The employee/contractor may then create a response to the document, and optionally attach supporting material for their response. The employee/contractor's response can be added to the blockchain, and the system can notify HR that the employee/contractor has submitted a response.

If the employee/contractor does not respond, then the system notifies HR that the employee/contractor has declined to respond to the approved document. If the employer/contractor does not complete their response within an employer-selected period of time (e.g., one day, two days, etc.) from their acknowledgment, it is marked that the employee/contractor declined to respond. All users who hold an "HR" role can see, retrieve and download finalized documents and accompanying information.

Other objects and embodiments of the invention will be apparent to those skilled in the art.

BRIEF DESCRIPTION OF THE DRAWINGS

These and other features, aspects, and advantages of the present invention will become better understood with regard to the following description, appended claims, and accompanying drawings, wherein:

FIG. 18 shows an example of a template for use in systems in accordance with the invention;

FIG. 22 shows an example of a hotline submission template in accordance with an embodiment of the invention;

FIG. 23 shows a sample policy update template in accordance with an embodiment of the invention;

FIG. 26 shows an example of a search window in accordance with an embodiment of the invention.

DETAILED DESCRIPTION OF THE PREFERRED EMBODIMENTS

Figure 1A:
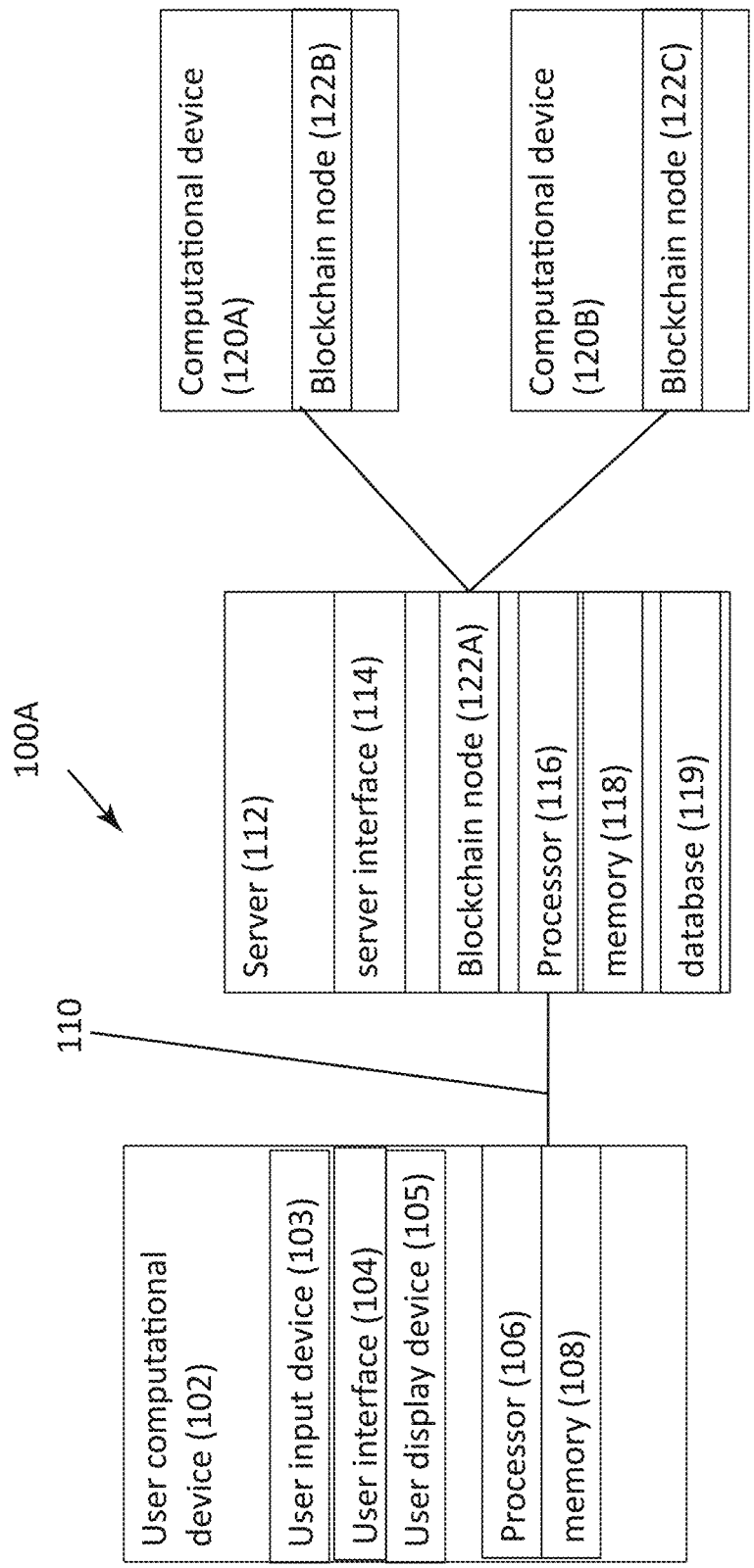
FIGS. 1A, 1B and 1C show block diagrams for a Document Creation system and method according to at least some exemplary embodiments of the present invention for document formation and communication.

The Document Systems and methods described herein can facilitate the formation, communication, and management of documents. These Document Systems are particularly well suited for documenting employee performance and other employment/HR related activities. Performance evaluations or reviews can include specific employment documents or forms. Document systems in accordance with the invention can potentially involve all supervisor created documents related to employee performance or conduct.

Many companies have difficulty locating their employees' or contractors' performance evaluations and the exact notifications received by specific workers on specific dates. Additionally, supervisors often need guidance to create effective documentation. Accordingly, it can be valuable to provide a computer implemented (e.g., server or cloud-based software) system to help standardize the process. This can help with creating, storing, accessing, searching for and retrieving the documents in a suitably accessible manner. It can also be important to render drafts and other non-finalized documents and comments thereon irretrievable, as memories fade over time and only the "official" document should remain. Document Systems in accordance with the invention are effective to permanently delete drafts and the like. They can also ensure that changes are not made to finalized documents and can identify the exact document received by specific individuals on particular dates. Therefore, Document Systems and methods in accordance with the invention ("Document Systems") can assist companies in creating, retrieving, accessing and storing their important HR related documentation.

Blockchain

An important aspect of the invention is the security and accuracy provided by the blockchain. A blockchain is a distributed database that maintains a list of data records. The security of the records is enhanced by the distributed nature of the blockchain. A blockchain typically includes several nodes, which may be one or more systems, machines, computers, databases, data stores or the like, which are operably connected with one another. In some cases, each of the nodes or multiple nodes are maintained by different entities.

A blockchain typically operates without a central repository or single administrator. One well-known application of a blockchain is the public ledger of transactions for cryptocurrencies such as the blockchain ledger used in bitcoin. The data records recorded in the blockchain are enforced cryptographically and stored on the nodes of the blockchain.

A blockchain provides numerous advantages over traditional database data storage. A large number of nodes of a blockchain may reach a consensus regarding the validity of a transaction contained on the transaction ledger. Similarly, when multiple versions of a document or transaction exist on the ledger, multiple nodes can converge on the most up-to-date version of the transaction. This can effectively eliminate access to the earlier, "unauthorized" versions, such that drafts and comments on the drafts can remain inaccessible and therefore, protected from undesired disclosure.

A blockchain system typically has two primary types of records. The first type is the "transaction" type, which consists of the actual data stored in the blockchain. The second type is the "block" type, which are records that confirm when and in what sequence certain transactions became recorded as part of the blockchain. Transactions are created by participants using the blockchain in their normal course of business and blocks are created by users known as "miners" who use specialized software/equipment to create the blocks. Users of the blockchain create transactions that are distributed to various nodes of the blockchain. A "valid" transaction is one that can be validated based on a set of rules that are defined by the particular system implementing the blockchain.

Storage databases typically employ pointers to access various types of stored information. Pointers are variables in programming, which store the address of another variable. Usually, normal variables in any programming language store data. Pointers, however, instead of storing values, will store the addresses of the pointed-to variables. They are called pointers because they are seemingly pointing at the location of other variables.

A linked list is an important item in data structures. It is a sequence of blocks, each containing data that is linked to the next block via a pointer. The pointer variable, in this case, contains the address of the next node in it and hence the connection is made. The pointer inside each block contains the address of the next block. A blockchain can be thought of as a linked list, that contains data and a "hash pointer" that points to its previous block, hence creating the chain. A hash pointer is similar to a pointer, but instead of just containing the address of the previous block it also contains the hash of the data inside the previous block.

Hashing is generating a value or values from a string of text using a mathematical function. A formula generates the hash, which helps to protect the security of the transmission against tampering. Creating a hash is generating a value or values from a string of text using a mathematical function. It is one way to enable security during the process of message transmission or storage, A formula generates the hash, which helps to protect the security of the transmission against tampering, because even slight changes, such as a change of case, will lead to a very different hash. Therefore, if someone were to try to change data stored on the blockchain, because of the properties of hash functions, a slight change in data will change the hash drastically. This means that any slight changes made in a block will change the hash which is stored in the prior block. That in turn will change the data and the hash of the prior block and so on and so forth. This will completely change the chain, which is impossible. This is how blockchains attain immutability.

Preferably the blockchain(s) that is/are implemented in accordance with the invention are capable of running code to facilitate the use of smart contracts. Smart contracts are computer processes that facilitate, verify and/or enforce negotiation and/or performance of a negotiated agreement between parties. One fundamental purpose of smart contracts is to insure the final document incorporates all the agreed-to features. Smart contracts may leverage a user interface that provides one or more parties administrators access, which may be restricted at varying levels for different people, to the terms and logic of the specific document being agreed to. Smart contracts typically include logic that emulates clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contracts may also be described as pre-written logic (computer code), stored and replicated on a distributed storage platform (i.e. blockchain), executed/run by a network of computers (which may be the same ones running the blockchain), which can result in ledger updates (employment records, etc.).

Smart contract infrastructure can be implemented by replicated asset registries and contract execution using cryptographic hash chains and Byzantine-fault-tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators.

Blockchain technology has rapidly progressed in the past years. Platforms are built and are being built on top of the existing blockchain technology that allows users to leverage the blockchain with additional flexibility. Examples of platforms are Ethereum and Hyperledger.

For all of these examples, security for the blockchain may optionally and preferably be provided through cryptography, such as public/private key, a hash function or digital signature, as known in the art.

In describing the novel system and method for creating, documenting, sending and receiving workplace communications and documentation and analyzing them, the provided examples should not be deemed to be exhaustive. While certain implementations are described hereto, it is to be understood that other variations are possible and will be apparent to those skilled in the art, without departing from the spirit, scope and nature of the invention.

Figure 1B:
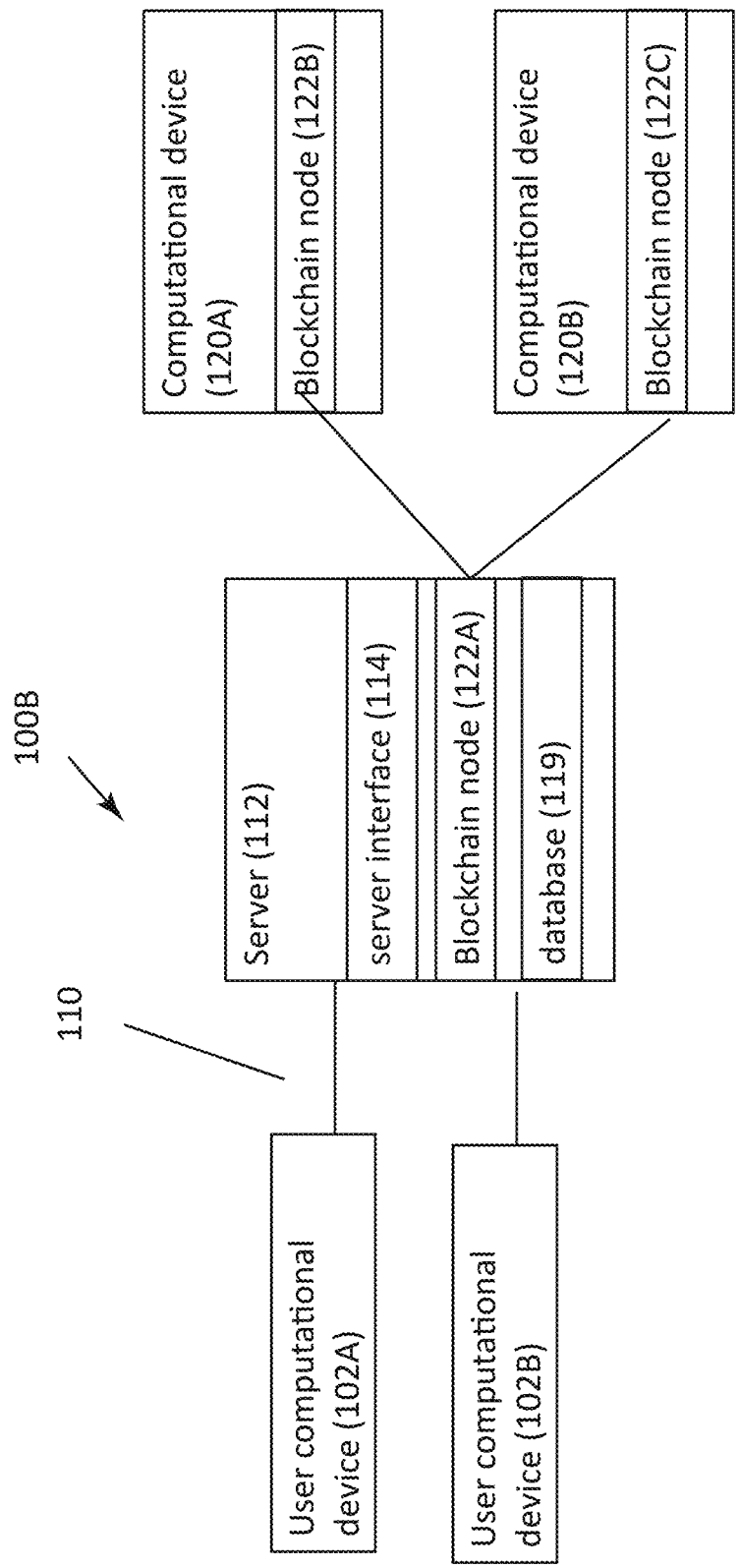
Figure 1C:
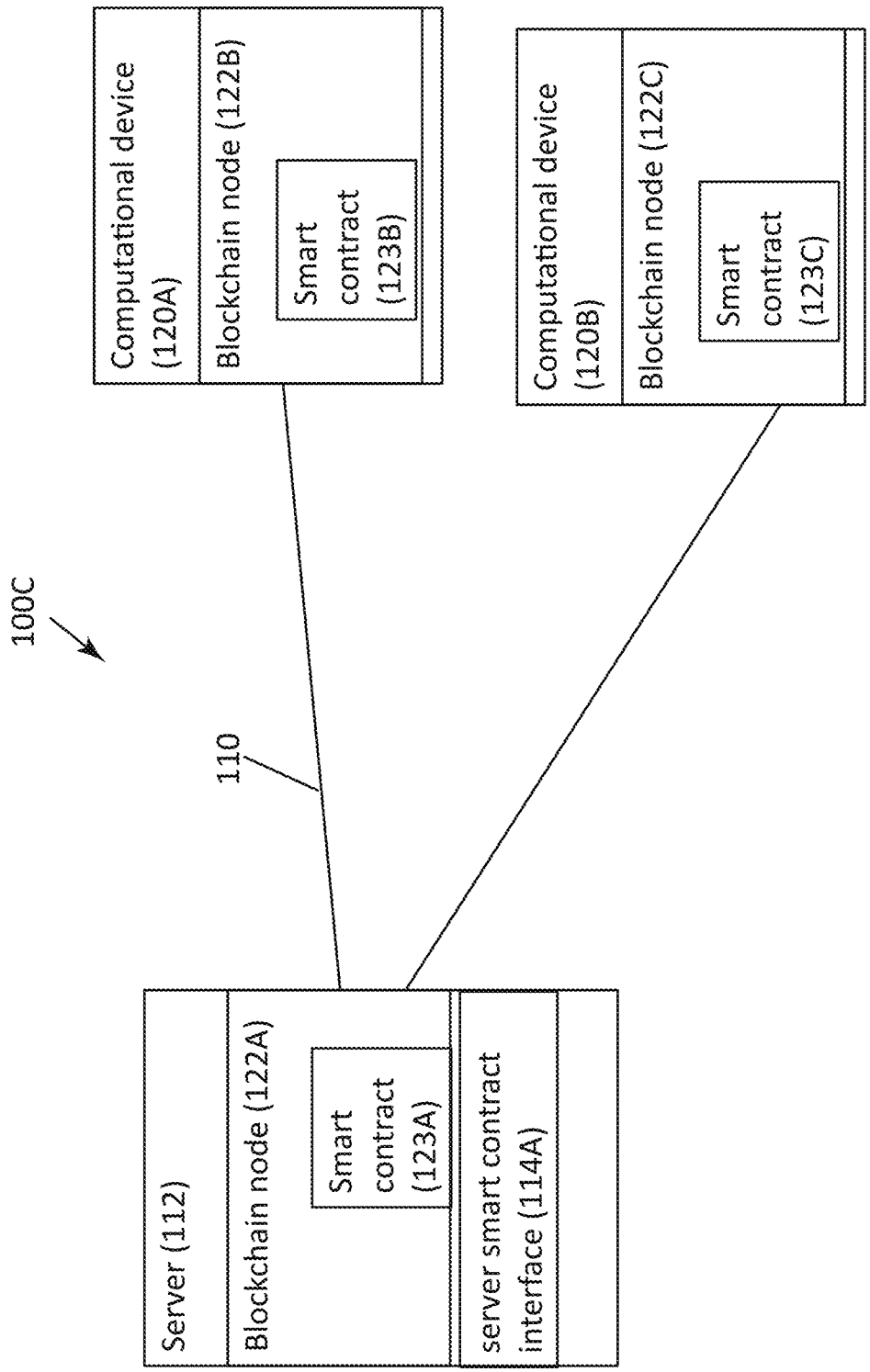

Turning now to the drawings, FIGS. 1A to 1C show a system and method according to certain exemplary embodiments of the invention.

A Document Creation system 100A features a user computational device 102 and a server 112 communicating via a computer network 110. User computational device 102 can optionally be any type of suitable computational device, including but not limited to a laptop computer, a desktop computer, a tablet, a smartphone, a PDA, a cellular telephone, a mobile device, and the like. Server 112 can optionally be any type of suitable server or a plurality of networked servers, including without limitation a collection of microservices, a virtual machine, or a plurality of hardware and/or virtual machines.

User computational device 102 features a user input device 103 and a user interface 104. User input device 103 can optionally include any type of suitable input device hardware, including but not limited to a keyboard, a pointing device such as a mouse or other type of pointing device, or a touch screen, or a combination thereof.

In one embodiment of the invention, user interface 104 includes a graphical user interface (GUI) or an interface to input computer-executable instructions that direct the processor to carry out specific functions. User interface 104 can employ certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

User interface 104 may optionally also be displayed through a user display device 105 and preferably includes the software needed to support receiving user instructions, displaying information to the user, querying the user, and so forth.

The software of user computational device 102 is stored on a memory device 108 and operated by a processor 106. Any method as described herein may be implemented as a plurality of instructions being executed by a processor. For user computational device 102, such instructions would be stored in memory 108 and executed by processor 106.

As used herein, a processor generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Instructions from user computational device 102 are sent to server 112 through computer network 110. Server 112 features a server interface 114, a processor 116, a memory device 118, a database 119, a blockchain node 122A, and/or other components. Server 112 may include a plurality of hardware, software, and/or firmware components operating together to provide the functionality attributed herein to server 112.

Memory 118 can comprise non-transitory storage media that electronically stores information. Memory 118 may include one or both of system storage that is provided integrally (i.e., substantially non-removable) with a respective component of system 100A and/or removable storage that is removably connected to a respective component of system 100A via, for example, a port (e.g., a USB port, a firmware part, etc.) or a drive (e.g., a disk drive, etc.).

Memory 118 may include one or more of optically readable storage media (e.g., optical discs, etc.), a magnetically readable storage medium (e.g., flash drive, etc.), and/or other electronically readable storage medium. Memory 118 may include one or more virtual storage resources (e.g., cloud storage, a virtual private network, and/or other virtual storage resources). Memory 118 may store software algorithms, information determined by the processor, and/or other information that enables components of a system 100A to function as described herein.

Blockchain node 122A is part of a blockchain network, which comprises a plurality of computational devices each operating a blockchain node. For example, a blockchain node 112B is operating on a computational device 120A and a blockchain node 122C is operating on a computational device 120B.

FIG. 1B is a block diagram of a Document Creation system 110B, as a variation of device 100A of FIG. 1A. System 100B features both user computational device 102A from FIG. 1A and also a user computational device 102B communicating with server 112 through computer network 110. Additional user computational devices are also acceptable.

FIG. 1C depicts a Document Creation system 100C as another variation of system 110A and 110B. FIG. 1C shows that system 100C includes blockchain node 122A featureing a smart contract feature 123A, as does blockchain node 122B and blockchain node 122C.

Figure 4A:
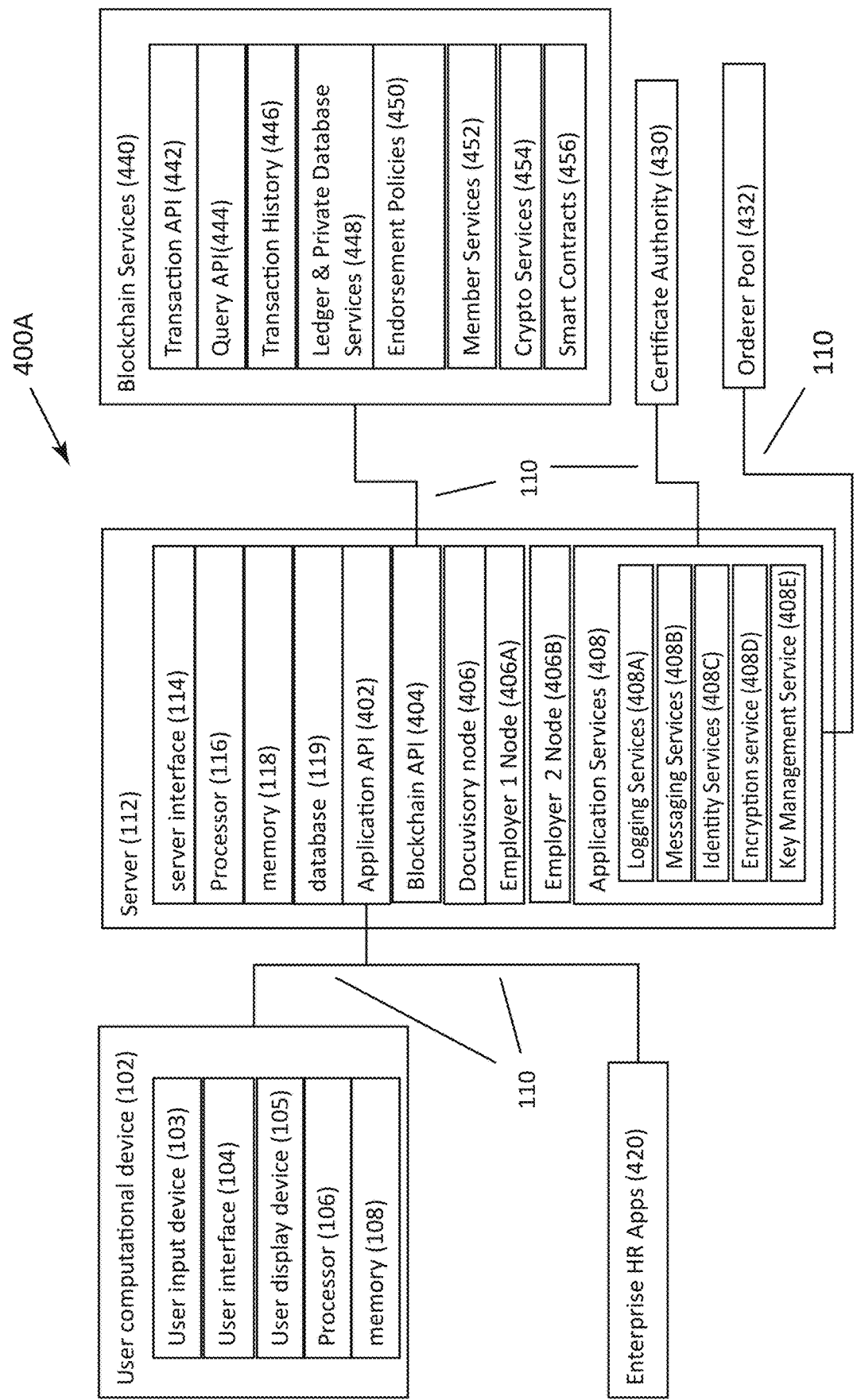
FIGS. 4A and 4B are block diagrams illustrating operational steps in a Document Creation system and method in accordance with another exemplary embodiment of the invention.
Figure 4B:
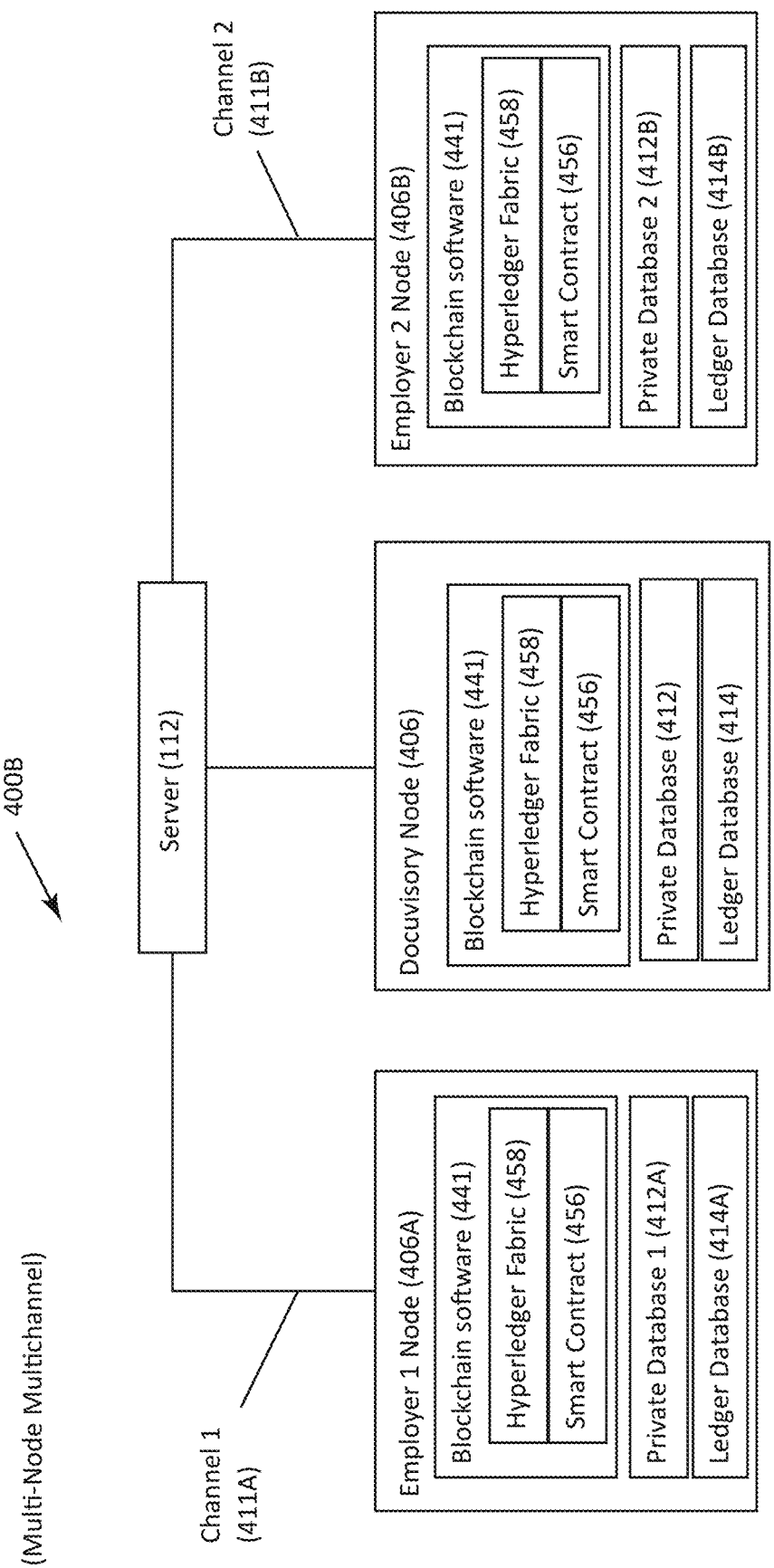

FIGS. 4A and 4B show a block diagram of another exemplary embodiment of the invention. Referring to FIG. 4A, a Document Creation system 400A is shown, featuring user computational device 102 and enterprise HR application 420, wherein each of these communicates with server 112 through computer network 110. In system 400A, both user computational device 102 and enterprise HR application 420 use an application API 402 to interact with server 112. Furthermore, although one user computational device 102, one enterprise HR application 420, and one server 112 are shown, system 400A may contain a plurality of additional user computational devices, enterprise HR applications, and servers.

The user computational device 102 of system 400A features user input device 103, user interface 104, user display device 105, processor 106, memory 108, and/or other components. Each element performs the same function of as in system 100A of FIG. 1A.

Enterprise HR applications 420 (or enterprise HR apps) are any known and acceptable human resource software that manages HR relationships. Examples of an enterprise application are well known in the art and include ADP Workforce Now, Zenefits, Kronos Workforce Ready, and Namely.

Referring to FIG. 4A, server 112 of system 400A consists of one or more linked servers, preferably an application server. Server 112 features server interface 114, processor 116, memory 118, database 119, an application API 402, a blockchain API 404, a Docuvisory blockchain node 406, an Employer 1 Node 406A, an Employer 2 Node 406B, an application services 408 component, and/or other components. Server 112 may include a plurality of hardware, software, and/or firmware components operating together to provide the functionality attributed herein to server 112.

Application services 408 features a logging services 408A, a messaging services 408B, an identity services 408C, an encryption service 408D, a key management service 408E, and/or other services. Logging services 408A manage which users can log into the system and the duration a user can stay logged into the system. Logging services 408A work in conjunction with identity services 408C. Identity services 408C identify which user (e.g., by email or other identifier) has logged into the system and allocate the appropriate resources for that user. Encryption service 408D encrypts data, such as communications and documents. Key management service 408E generates and manages the public and private key associated with encryption service 408D.

The blockchain API 404 is an application programming interface that communicates with a blockchain services 440. Blockchain services 440 features a transaction API 442, a query API 444, a transaction history 446, a ledger and private database services 448, an endorsement policies 450, a member services 452, a crypto services 454, a smart contract services 456, and/other services. Transaction API 442 executes transactions with the blockchain. Query API 444 queries data from the blockchain. Transaction history 446 obtains transaction history from the blockchain. Ledger and private database services 448 control the storage of data on private databases and/or the blockchain ledger. Endorsement policies 450 manage transactions that must be signed and endorsed by peers (i.e., nodes) before the transactions are applied to the blockchain ledger.

A certificate authority 430 controls which user has the authority (credentials) to access certain information. Certificate authority 430 registers identities to networking participants and users and connects to any user registry. For example, each user can be assigned a unique email address and authority credentials are associated with that unique address.

An orderer pool 432 is responsible for managing the sequence that transactions are received. Transactions can happen simultaneously. Orderer pool 432 is formed from multiple orders to provide high availably.

FIG. 4B is a block diagram illustrating the steps of multi-node multichannel operation of server 112. Server 112 is preferably an application server, communicating securely with Docuvisory node 406 and multiple employer nodes, such as Employer 1 Node 406A and Employer 2 Node 406B.

As shown, each employer node has a specific channel that allows communication between server 112 and a specific employer node, wherein the communication is not visible to other employer nodes. For example, Employer 1 Node 406A communicates with server 112 through Channel 1 (411A), which is not visible to Employer 2 Node 406B. Moreover, Employer 2 Node 406B communicates with server 112 through Channel 2 (411B), which is not visible to Employer 1 Node 406A. However, Docuvisory node 406 is a participant in every channel assigned to an employee node. Thus, Docuvisory node 406 is able to see all data in the blockchain ledger. However, the data can be encrypted, so that Docusvisory node 406 is not able to access the data.

Each node can feature a private database, ledger database, and blockchain software. For example, Docuvisory Node 406 can feature a blockchain software 411, a private database 412, and a ledger database 414.

Blockchain software 441 can feature a HyperLedger Fabric 458 and a Smart Contract 456. HypberLeger Fabric 458 can be a distributed system comprising a consortium of different nodes, where a ledger is shared among all participants if they are connected to the same channel.

Document Creation

Figure 2:
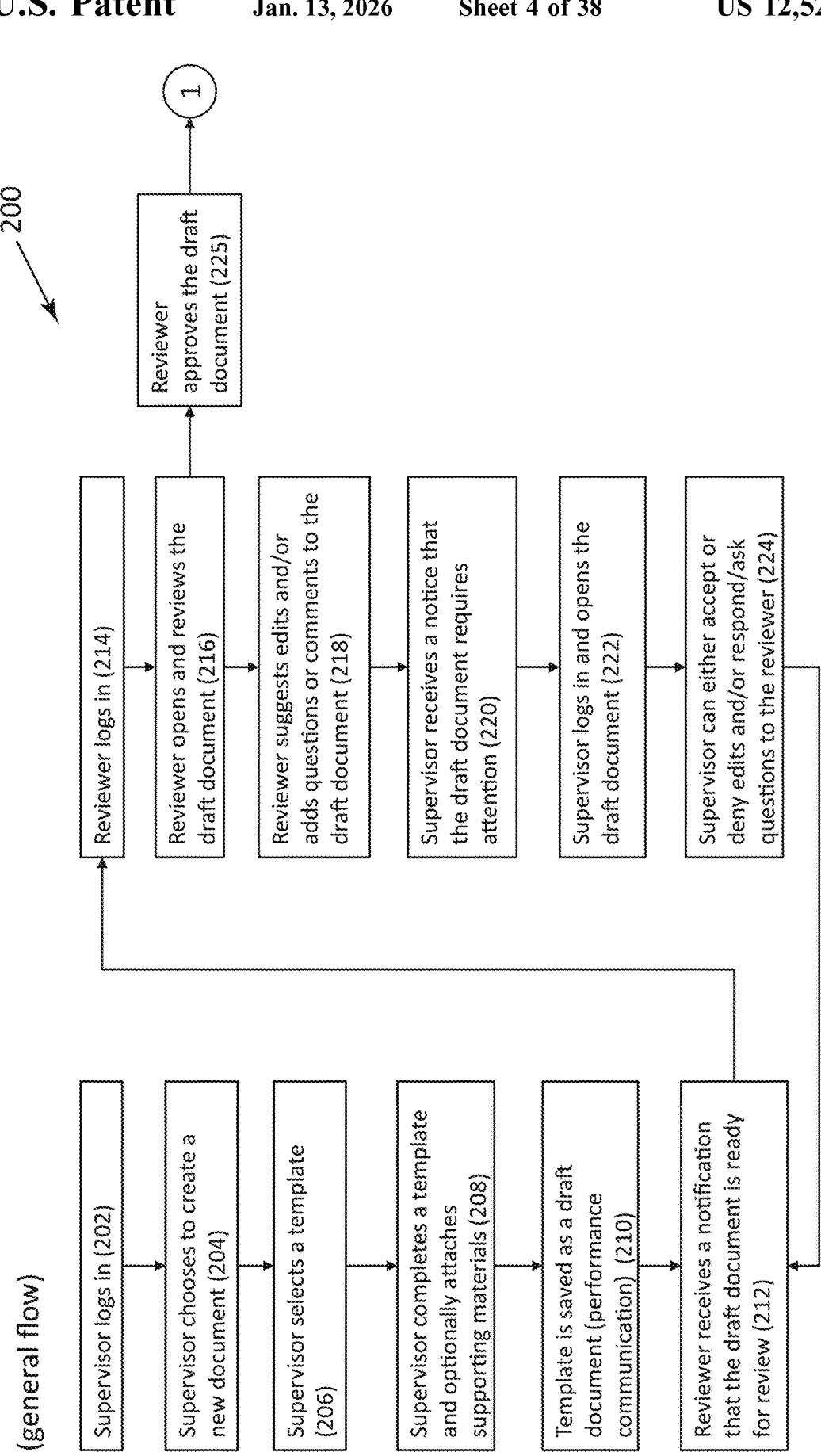
FIG. 2 is a block diagram showing the general flow of a Document Creation system in accordance with an embodiment of the invention.
Figure 2:
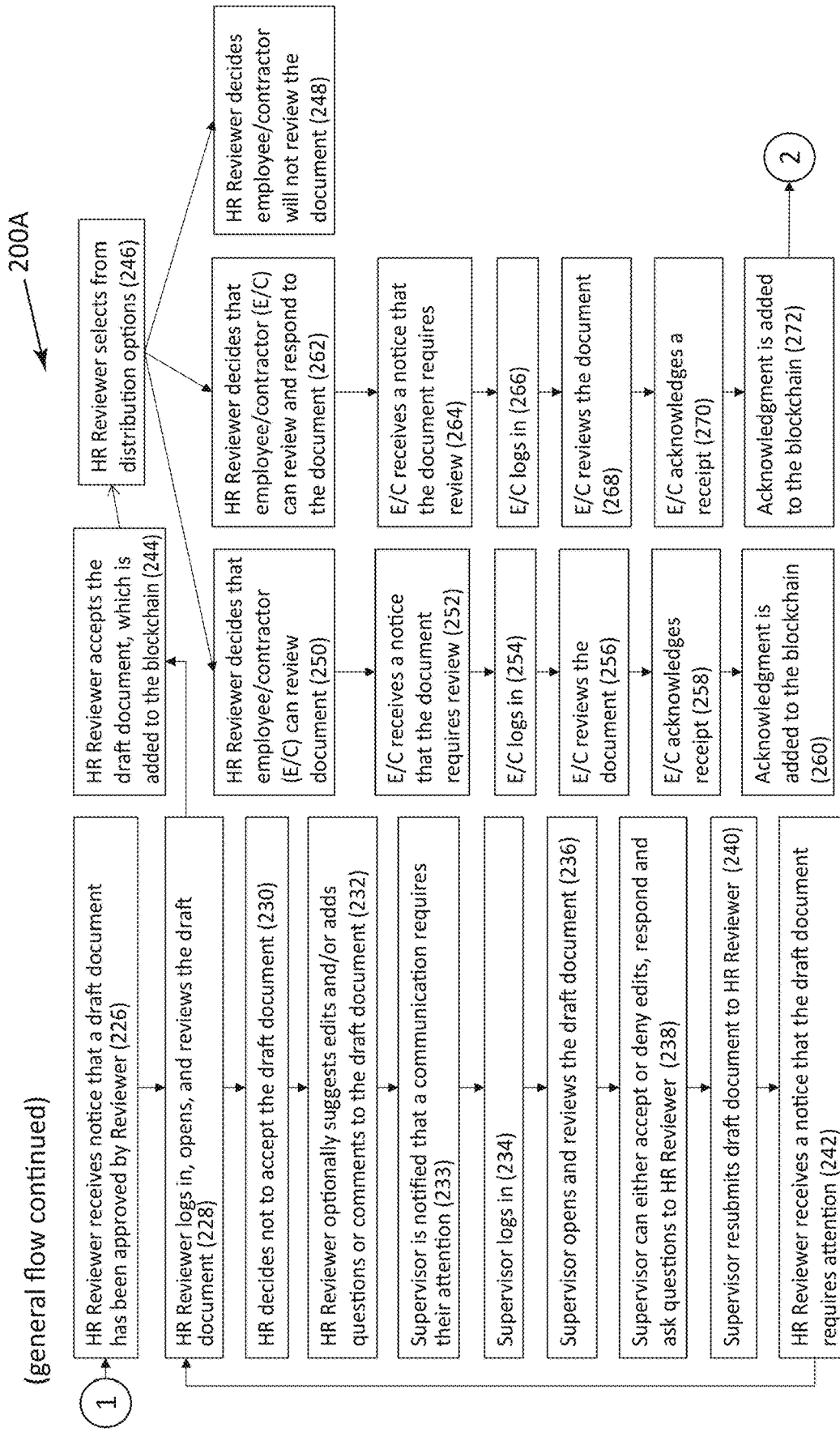
Figure 2:
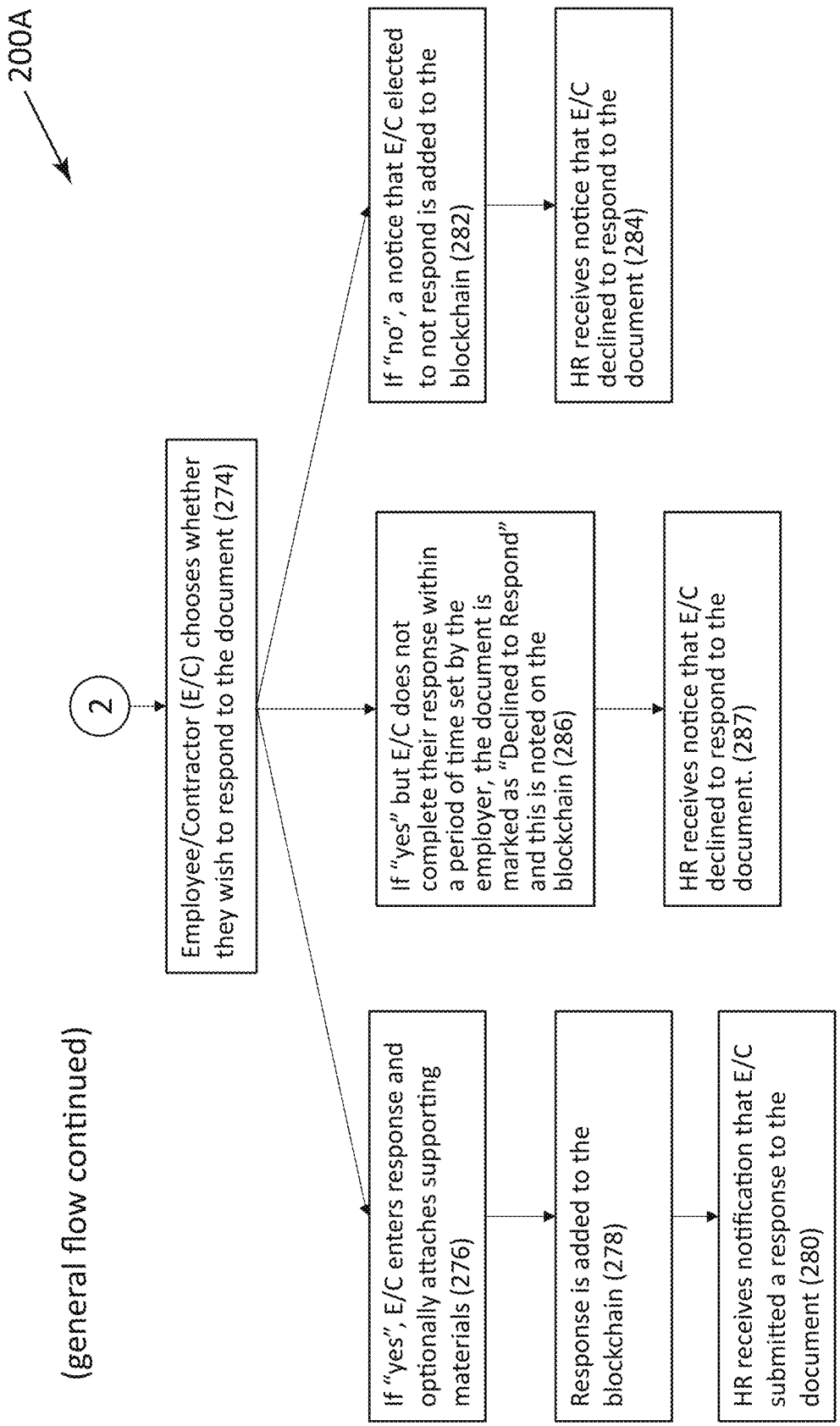

FIG. 2 is a block diagram illustrating the steps of a general Document Creation flow 200 of the Document Creation system. Certain users (e.g., employees/contractors) have a supervisor designation associated with their unique identifier, such as their email address and can log in as supervisors. Document creation 200 starts with the supervisor logging into a system 202, preferably using a two-step authentication process. The supervisor can choose to create a new document (Step 204) and then selects a template (Step 206) to create the new document.

After creating the document by completing the template, the supervisor can optionally associate (attach) supporting materials with the new document (Step 208). Examples of supporting materials can be, but are not limited to, employee logs, incident reports, and employee performance reviews.

After completing the template and optionally attaching supporting documents, the supervisor saves the draft document (i.e., performance communication) in Step 210. The draft document is preferably encrypted and stored in a data "container". When the draft is deleted, the encryption key is also deleted. This makes the deleted draft essentially irretrievable.

Preferably, one user (employee or contractor) for each employer is designated to fill the "reviewer" role. This status is associated with their identifier (e.g., email address). After the draft document is saved and submitted for review the reviewer receives a notification that the draft document is ready for review (Step 212). Notification is preferably sent by electronic mail (i.e., email).

After receiving the notification, the reviewer logs into the system (Step 214). Next, the reviewer opens and reviews the draft document (Step 216). The reviewer can either "approve" or "reject" the draft document.

If the reviewer does not approve the draft document, a reviewer-supervisor review/revision loop is created. In that review/revision loop, the reviewer can suggest edits and/or add questions or comments to the draft document for the supervisor (Step 218). After these edits, questions, and comments are saved, the reviewer can send the draft back to the supervisor. The supervisor then receives a notification that the draft document requires the supervisor's new attention (Step 220). Notification is preferably sent by electronic mail (i.e., email), but notifications can be sent by other means, such as Short Message Service (SMS) notification, push notification, or voice communication.

When the supervisor logs into the system, they can open the draft document and see the reviewer's edits, questions, and/or comments (Step 222). Next, the supervisor can either accept or reject the reviewer's edits and make changes based on the questions and/or comments (Step 224). After the supervisor addresses the reviewer's questions, comments and edits, including , accepting or rejecting specific proposed reviewer edits the supervisor resubmits the draft to the reviewer for review. The reviewer then receives a new notification that the draft document is again ready for review (Step 212). The reviewer again logs into the system (Step 214) to open and review the draft (Step 216). The loop repeats until the reviewer approves the draft document.

Alternatively, the reviewer approves the draft document when it is submitted by the supervisor, either initially or after revisions (Step 225). The process continues. One HR status user is also assigned also hold Human Resource reviewer ("HR reviewer") identifying credentials associated with their identifier (e.g., email address). After the supervisor and reviewer have approved the draft such as by the reviewer clicking an <Approved> button on their screen, a user designated HR reviewer will receive notification that a document requires their attention. (Step 226). The HR reviewer logs into the system and opens and reviews the draft document (Step 228). The HR reviewer has the option to either accept/approve the draft document or not accept the draft document (Step 230).

If the HR reviewer does not accept the draft document, an HR reviewer-supervisor review/revision loop is created. There, the HR reviewer may optionally suggest edits and/or add questions or comments to the draft document (Step 232) and send the draft back to the supervisor for revision. Next, the supervisor receives a notification that the draft requires their attention (Step 233). Notification is preferably sent by electronic mail (i.e., email). Optionally, notifications can be sent by short message service (SMS) notification, push notification or voice communication.

As a result of the HR reviewer-supervisor revision loop, after the supervisor logs into the system (Step 234) and opens and reviews the draft document (Step 236), the supervisor revises the draft, responds to the HR reviewer's suggested revisions, questions and comments, including rejecting or accepting specific proposed edits. (Step 238). The supervisor then resubmits the draft document to the HR reviewer for review (Step 240). The HR reviewer then receives a notification that the draft document requires HR's attention (Step 242). The HR reviewer again logs into the system and opens and reviews the draft document (Step 228). The loop repeats if the HR reviewer does not accept the draft document.

Alternatively, either after the reviewer approves the draft or the supervisor responds to the HR reviewer's proposed revisions, the HR reviewer accepts the draft document and the draft document becomes a final document and is added to the blockchain (Step 244) and it can no longer be changed. The HR reviewer can then select the distribution options (Step 246) for the approved completed finalized document. The distribution options are: (1) the employee/contractor who is the subject of the document is given an opportunity to review the approved document (Step 250); (2) employee/contractor who is the subject of the document is given the opportunity to review and respond to the approved document (Step 262); and (3) the employee/contractor who is the subject of the document is not given the opportunity to review approved document (Step 248).

If the HR reviewer selects option 3, the employee/contractor who is the subject of the document does not review the document. Similar to options 1 and 2, the document is added to the blockchain.

If the HR reviewer selects option 1, the employee/contractor can review the approved document (Step 250). The employee/contractor receives notification that a document requires review (Step 252). Notification is preferably sent by electronic mail (i.e., email), but notifications can be sent by other means, such as Short Message Service (SMS) notification, push notification, or voice communication. Next, that employee/contractor logs into the system (Step 254) and reviews the document (Step 256). The employee/contractor acknowledges receipt of the document (Step 258). The employee/contractor's acknowledgment is added to the blockchain (Step 260).

If HR selects option 2, the employee/contractor can review and respond to the document (Step 262). The employee/contractor receives notification that a document requires review (Step 264). Notification is preferably sent by electronic mail (i.e., email), but notifications can be sent by other means, such as Short Message Service (SMS) notification, push notification, or voice communication. Next, the employee/contractor logs into the system (Step 266) and reviews the document (Step 268). The employee/contractor acknowledges receipt of the document (Step 270). The employee/contractor's acknowledgment is added to the blockchain (Step 272).

The process of option 2 should continue with the employee/contractor choosing whether to respond or not respond to the document (Step 274). If the employee/contractor decides to respond, the employee/contractor enters his or her response and optionally attaches supporting materials (Step 276). The employee/contractor's response is added to the blockchain (Step 278). HR also receives notification that the employee/contractor has submitted a response to the document (Step 280). If the employee/contractor declines to respond, notice that the employee/contractor declined to respond is added to the blockchain (Step 282). HR receives notification that the employee/contractor declined to respond to the document (Step 284). If the employee/contractor opts to respond but fails to do so within a period of time set by the employer (e.g., one day, two days, etc.), the document will also be marked as "Declined to respond" (Step 286)

Hotline Tool

Figure 3A:
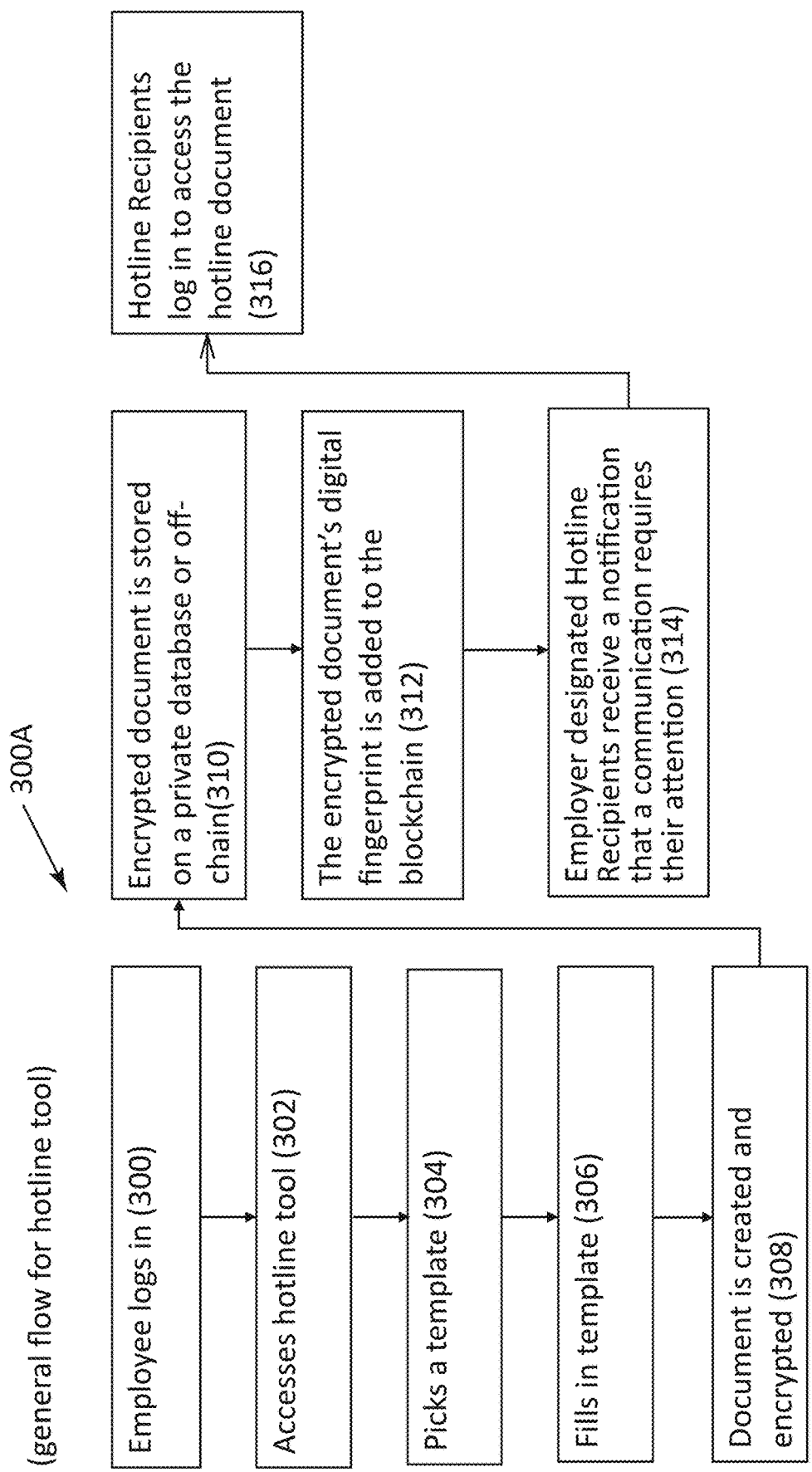
FIG. 3A is a block diagram illustrating the general flow for a hotline tool in accordance with an embodiment of the invention.

FIG. 3A illustrates the steps of a general flow for a hotline tool (300A) in accordance with preferred embodiments of the invention. The hotline tool is designed to facilitate a users' (employees' or contractors') ability to inform their employer of potential problems, such as discrimination, inappropriate conduct, work rule violations, or other issues and to allow employers to maintain an accurate record of such submissions/complaints.

In FIG. 3A, a hotline process 300A starts with a user logging into the system (Step 300) and accessing the hotline tool (Step 302). Next, the user selects a template (Step 304), such as from a drop-down menu and then creates a document by filling out the template (Step 306). Once the template is completed, the document is created and preferably encrypted (Step 308). The document can be encrypted using cryptographic keys. However, this is not the only way to encrypt the document. The encrypted document is preferably stored in a database and not stored on the blockchain (Step 310). However, the encrypted document digital fingerprint is added to the blockchain (Step 312). Next, a user who has been assigned the status of "Hotline Recipient" receives a notification that a hotline document was created (Step 314), and can access that document by logging into the platform, where the submission can be found in their Inbox (Step 316). Additionally, all users who have been assigned an "HR" role can see finalized hotline submissions in their Filed box.

Search Feature

Figure 3B:
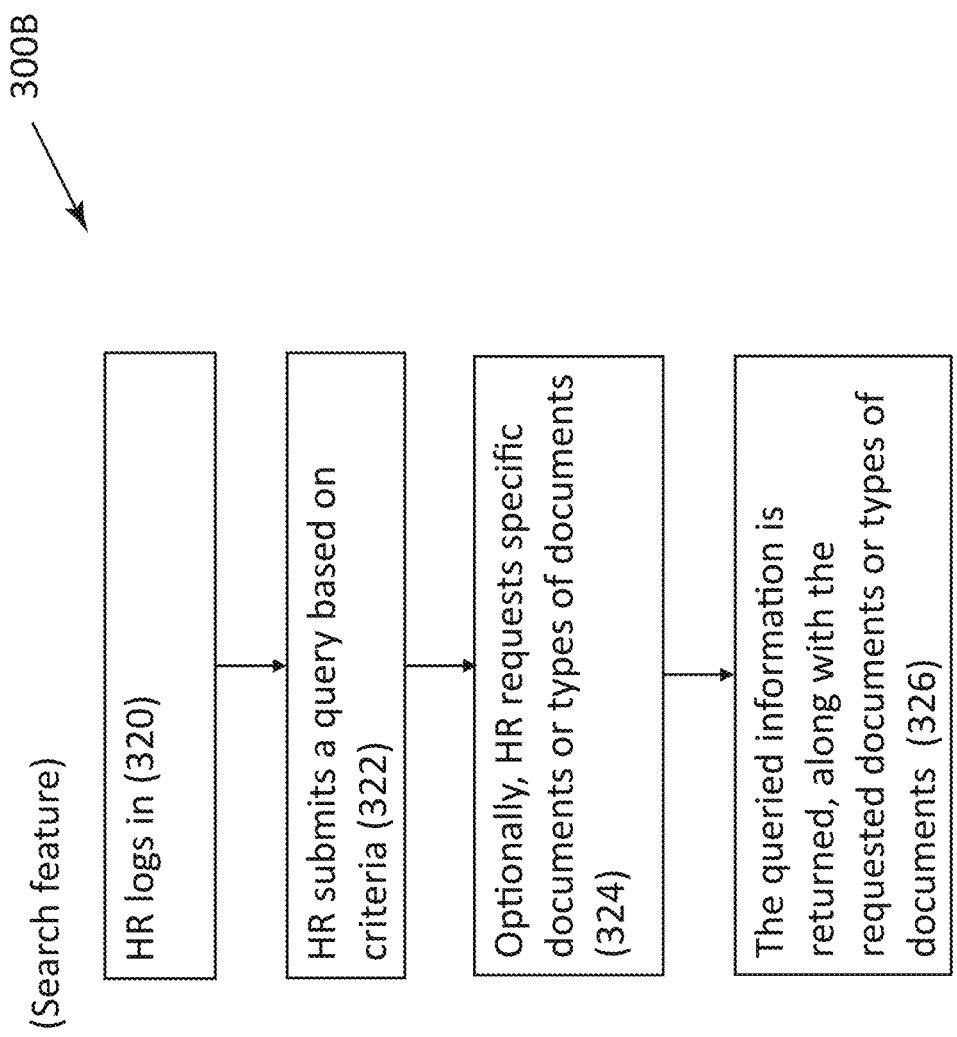
FIG. 3B is a block diagram illustrating search features of a Document Search and Retrieval system in accordance with an embodiment of the invention.

It is advantageous for the system to include a search feature. FIG. 3B illustrates the steps for using a search feature of the system. A search process 300B starts with an HR user logging into the system (Step 320). HR submits a search query based on determined criteria (Step 322). HR can submit a query for, but not limited to, pulling documents related to an employee/contractor or group of employees/contractors, pulling a list of all employee(s)/contractor(s) who did not sign a receipt for a communication and/or those employees/contractors who do not agree to a notice, sending a reminder communications to those employees/contractors who have not signed a receipt, retrieving notifications that were sent to employees, contractors or supervisors, searching for documents that employees have received and been given the opportunity to respond to where the employee has indicated they wanted to respond but has not submitted a response.

Optionally, HR can request specific documents or types of documents (Step 324). The system returns the queried information, along with the requested documents or types of documents, to HR (Step 326). In preferred embodiments of invention, HR users can have access to the search feature for all finalized documents (e.g., performance documents, notifications and hotlines). Additionally, administrators can be given the ability to download all documents, such as for creating back-ups, even if they cannot search or see the actual documents themselves.

Data Transmission

Figure 5A:
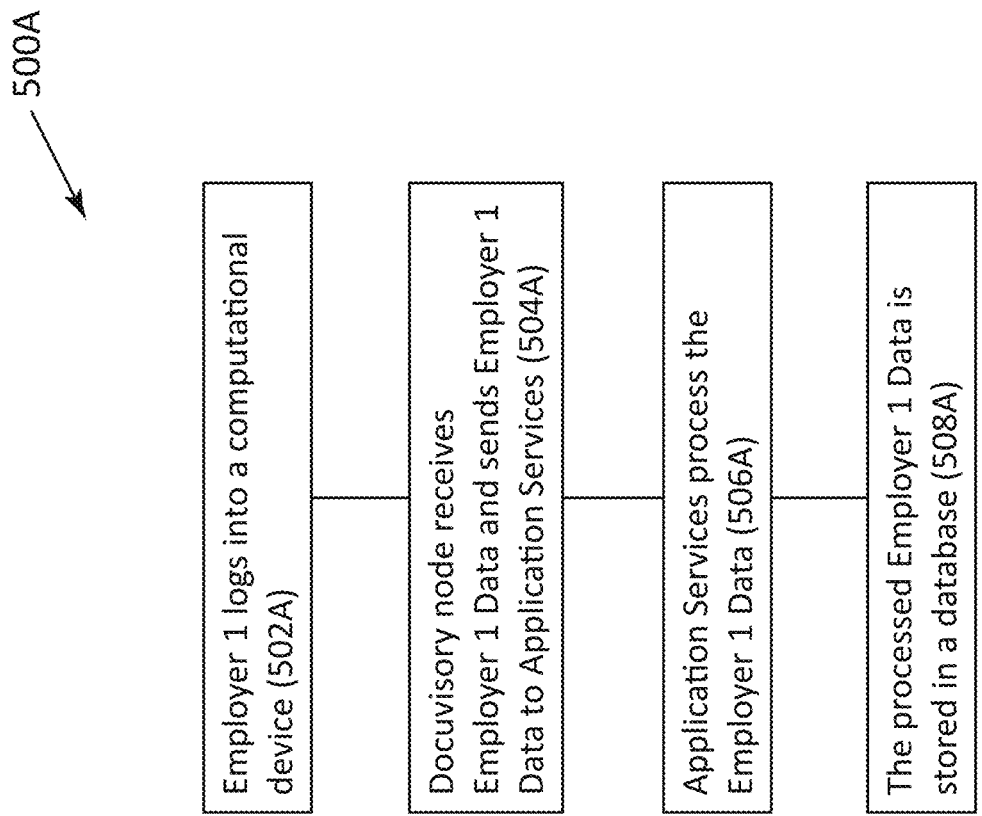
FIGS. 5A and 5B are block diagrams illustrating steps of how an employer can transmit data through the application API of an application server for processing and storage for a Document Creation system according to an embodiment of the invention.
Figure 5B:
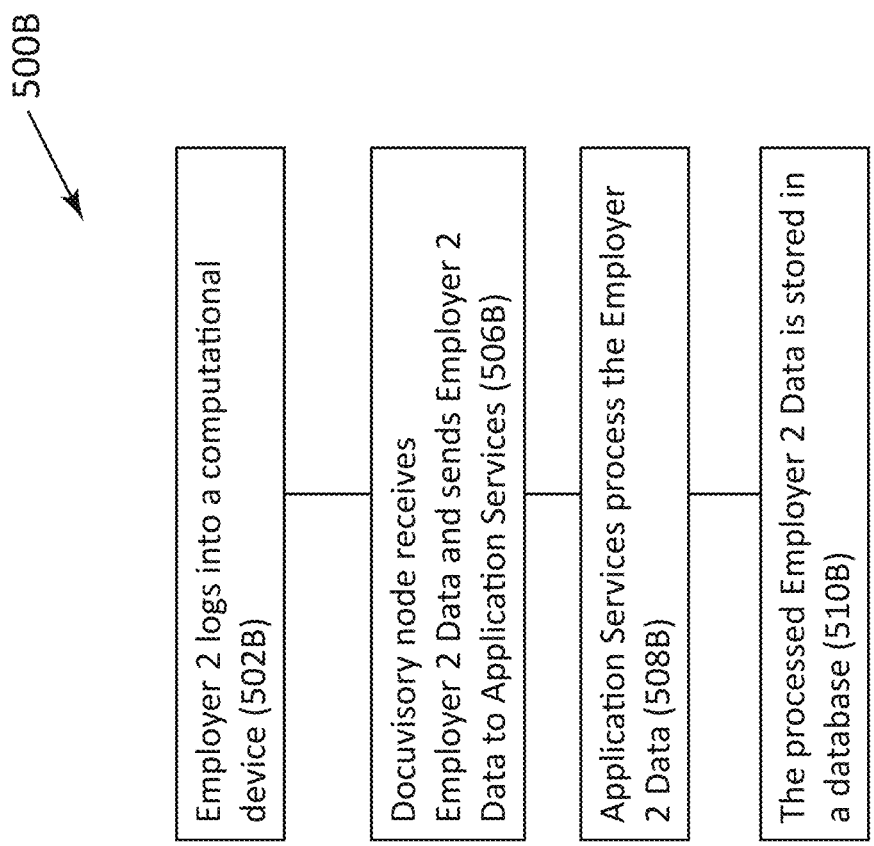

FIGS. 5A and 5B illustrate a data transmission process 500A through application API 402 of application server 122 for processing and storage. In FIG. 5A, process 500A starts with Employer 1 logging into a computational device, such as user computational device 102 (Step 502A). The computational device interacts with application API 402 of application server 112 to upload the Employer 1 data. Next, Docuvisory node 406 receives and sends the Employer 1 data to application services 408 (Step 504A). Application services 408 process the Employer 1 data (Step 506A) and sends the processed data to a database for storage (508A).

FIG. 5B illustrates a data transmission process 500B, which is similar to process 500A, but for a different employer. Similarly, process 500B starts with Employer 2 logging into a computational device (Step 502B), which interacts with application API 402 (Step 402) to upload the Employer 2 data. Docuvisory node 406 receives and sends the Employer 2 data to application services 408 (Step 506B). Application services 408 processes the Employer 2 data (Step 508B) and send the processed data to a database for storage (Step 510B).

Figure 5C:
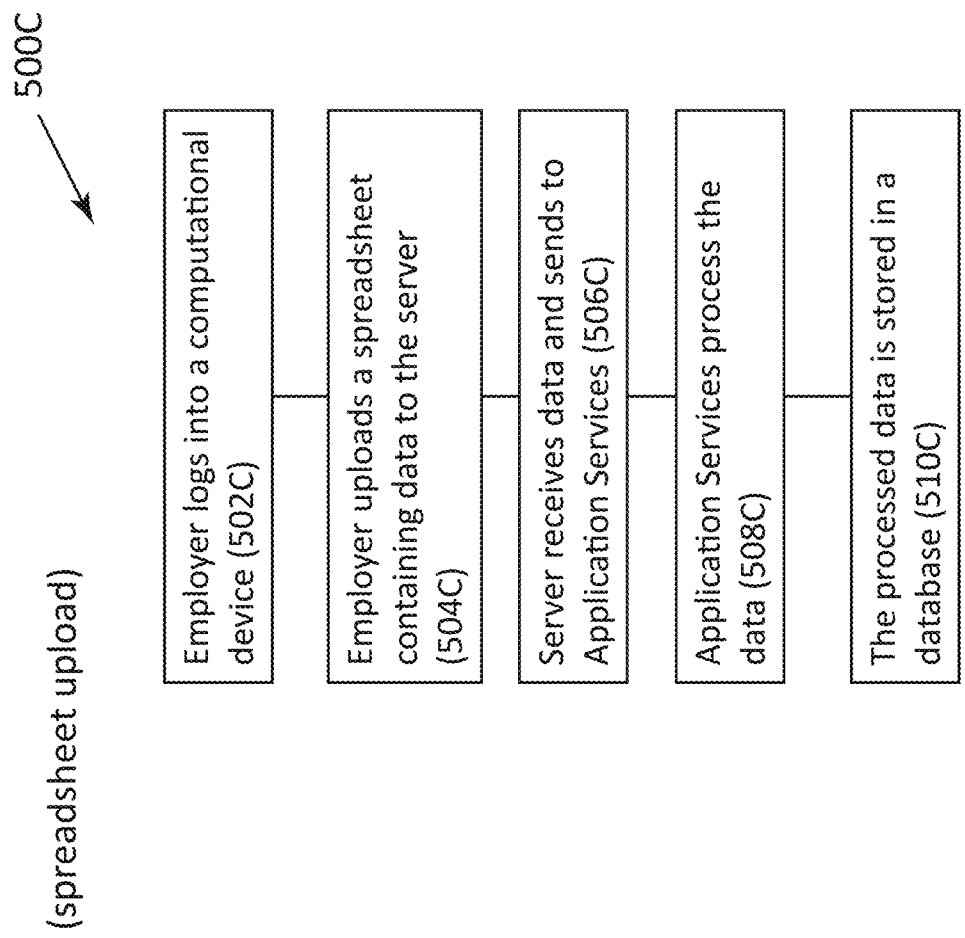
FIG. 5C is a block diagram illustrating how an employer can upload spreadsheet data into a Document Creation system according to an embodiment of the invention.

FIG. 5C illustrates an employer uploading spreadsheet data into the system in a process 500C. Process 500C starts with an employer logging into a computational device (Step 502C). The computational device interacts with application server 112 through server interface 114. Using the computational device, the employer uploads the spreadsheet containing data to the server (Step 504C). The server receives and sends the data to application services 408 (Step 506C). Application services 408 processes the data (Step 508C) and sends the processed data to a database for storage (Step 510C).

Multi-Node Multichannel

Figure 5D:
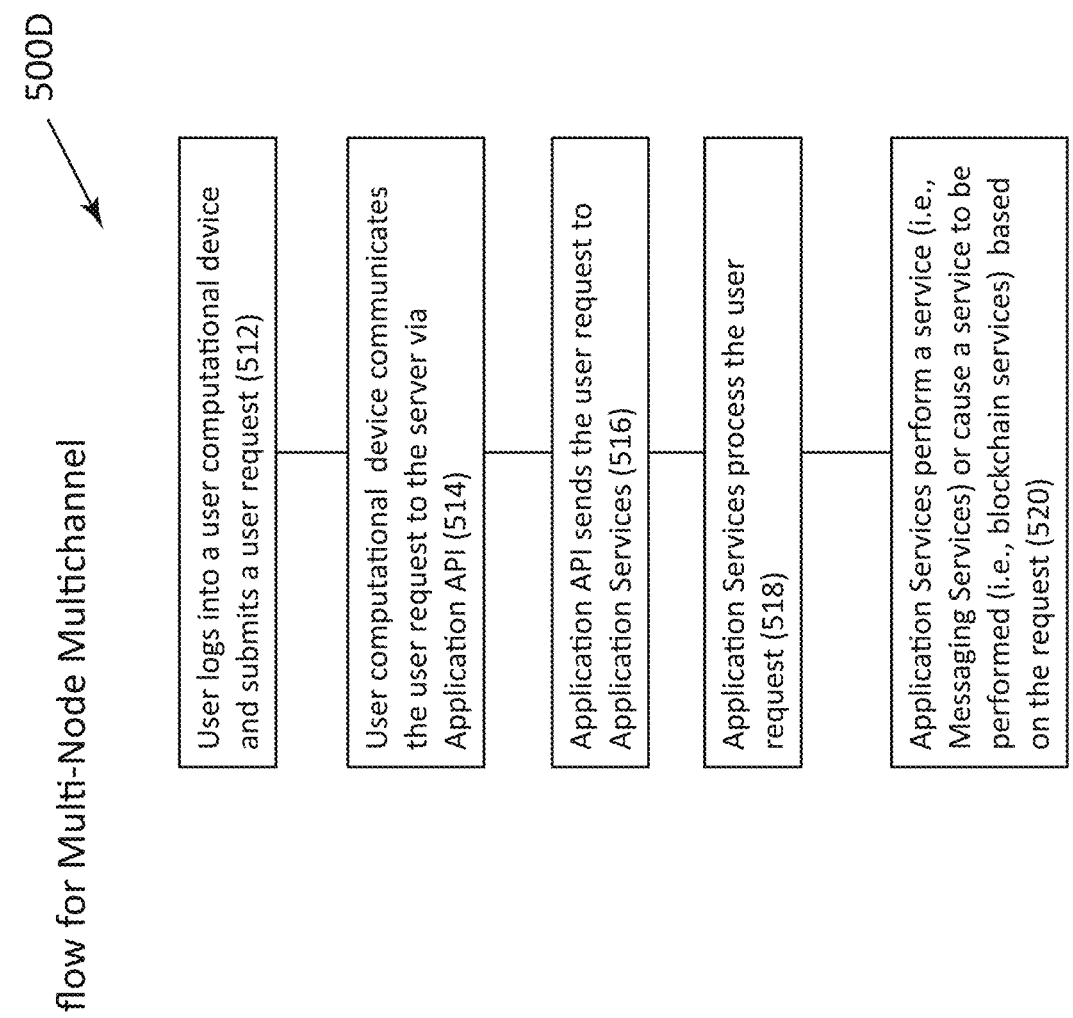
FIG. 5D is a block diagram illustrating multi-node multi-channel operation of how a user can upload a request to a Document Creation system according to an embodiment of the invention.

FIG. 5D illustrates a multi-node multichannel process 500D. Process 500D starts with a user logging into user computational device 102 and submitting a user request (Step 512). User computational device 102 communicates the user request to application server 112 through application API 402 (Step 514). Application API 402 sends the user request to application services 408 for processing (Step 516). Application services 408 processes the user request (Step 518) and then performs a service (e.g., a message service) or causes a service to be performed (e.g., a blockchain service) based on the user request (Step 520).

Figure 5E:
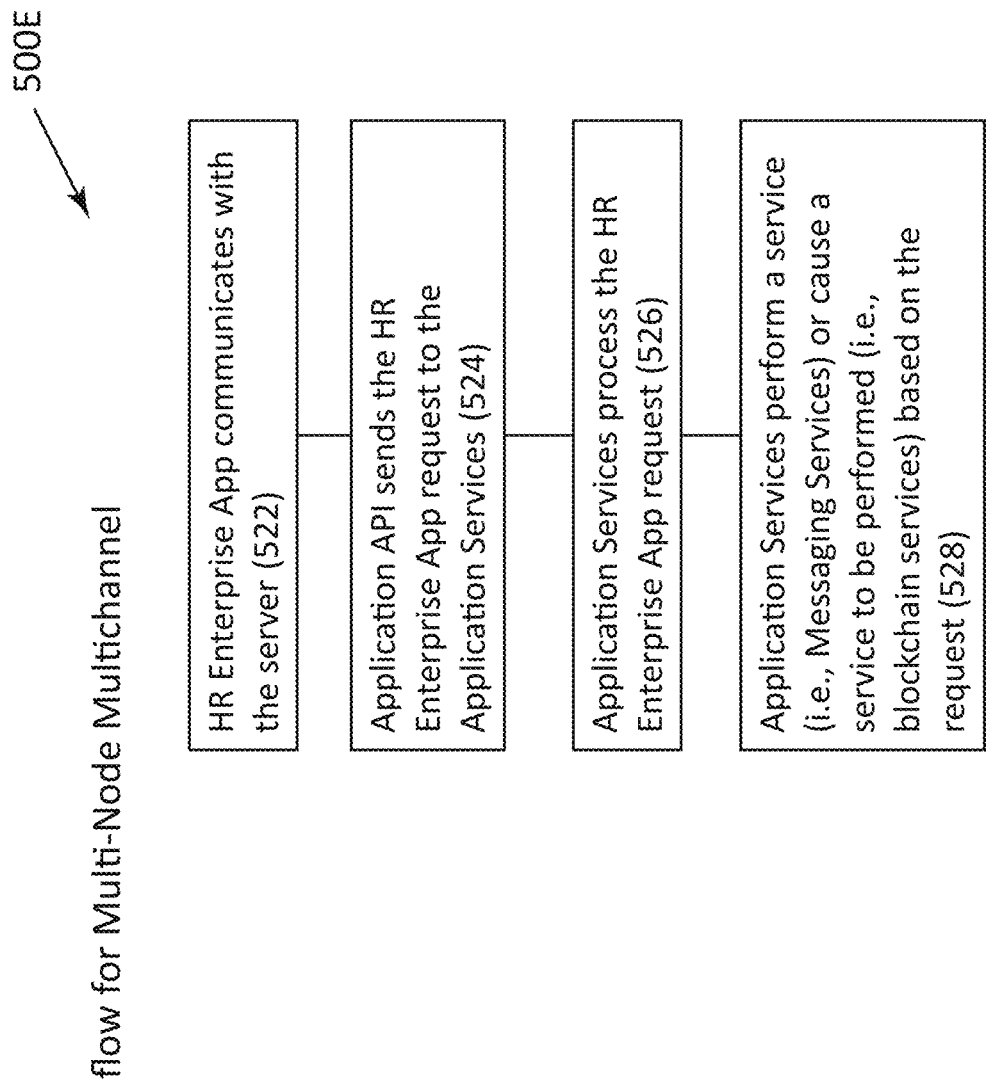
FIG. 5E is a block diagram illustrating how an HR enterprise application can interact with a Document Creation system according to an embodiment of the invention.

FIG. 5E illustrates a process 500E for an HR enterprise application 420 interacting with the system. Process 500E starts with an HR enterprise application 420 sending a request and interacting with application API 402 of application server 112 (Step 522). Application API 402 receives and sends the request to application services 408 for processing (Step 524). Application services 408 processes the request (Step 526) and then performs a service (e.g., a message services) or causes a service to be performed (e.g., a blockchain service) based on the request (Step 528).

Employer Notification

Figure 6:
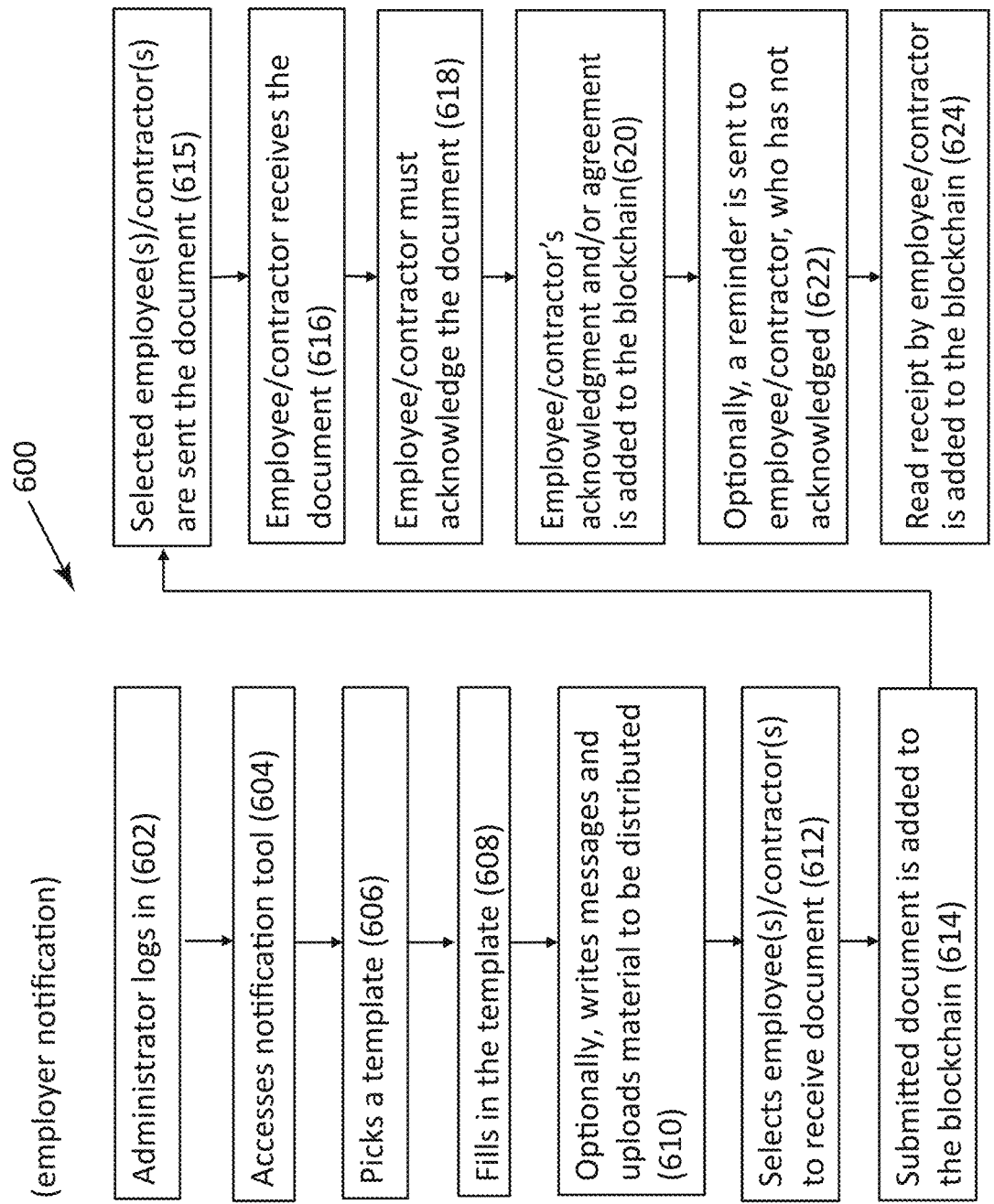
FIG. 6 is a block diagram illustrating an employer notification process of a Document Creation system according to an embodiment of the invention.

FIG. 6 illustrates an employer notification process 600 of the system. Process 600 starts with a user who has been designated as an administrator, logging into the system (Step 602) and accessing the notification tool by selecting the create new document button (Step 604). Next, the administrator selects (e.g., from a drop-down menu) and fills out a template (Steps 606 and 608). Optionally, HR or the administrator can write a message and/or upload documents (Step 610). In one embodiment of the invention, HR or the administrator can select an option that requires an employee/contractor to acknowledge receipt and/or agree to additional t4erms created in step 608 when the template is completed.

Next, the administrator selects (e.g., from a drop-down menu) the users (employees/contractors) that are to receive the document (Step 612). The document is then submitted to the blockchain (Step 614) and sent to the selected employees/contractors (Step 615). Recipients receive an email notifying them that a communication requires their attention. Recipients can log into their platform and view the notification in both their Inbox and their Filed box for later review. Once the document is opened in their inbox, each selected recipient can be required to acknowledge receipt. (Step 618). Each employee/contractor's acknowledgment and/or agreement is added to the blockchain (Step 620).

Optionally, a reminder can be sent to each employee/contractor that has not acknowledged receipt (Step 622). The read receipt of each employee/contractor can be added to the blockchain (Step 624).

Dispute Resolution

Figure 7:
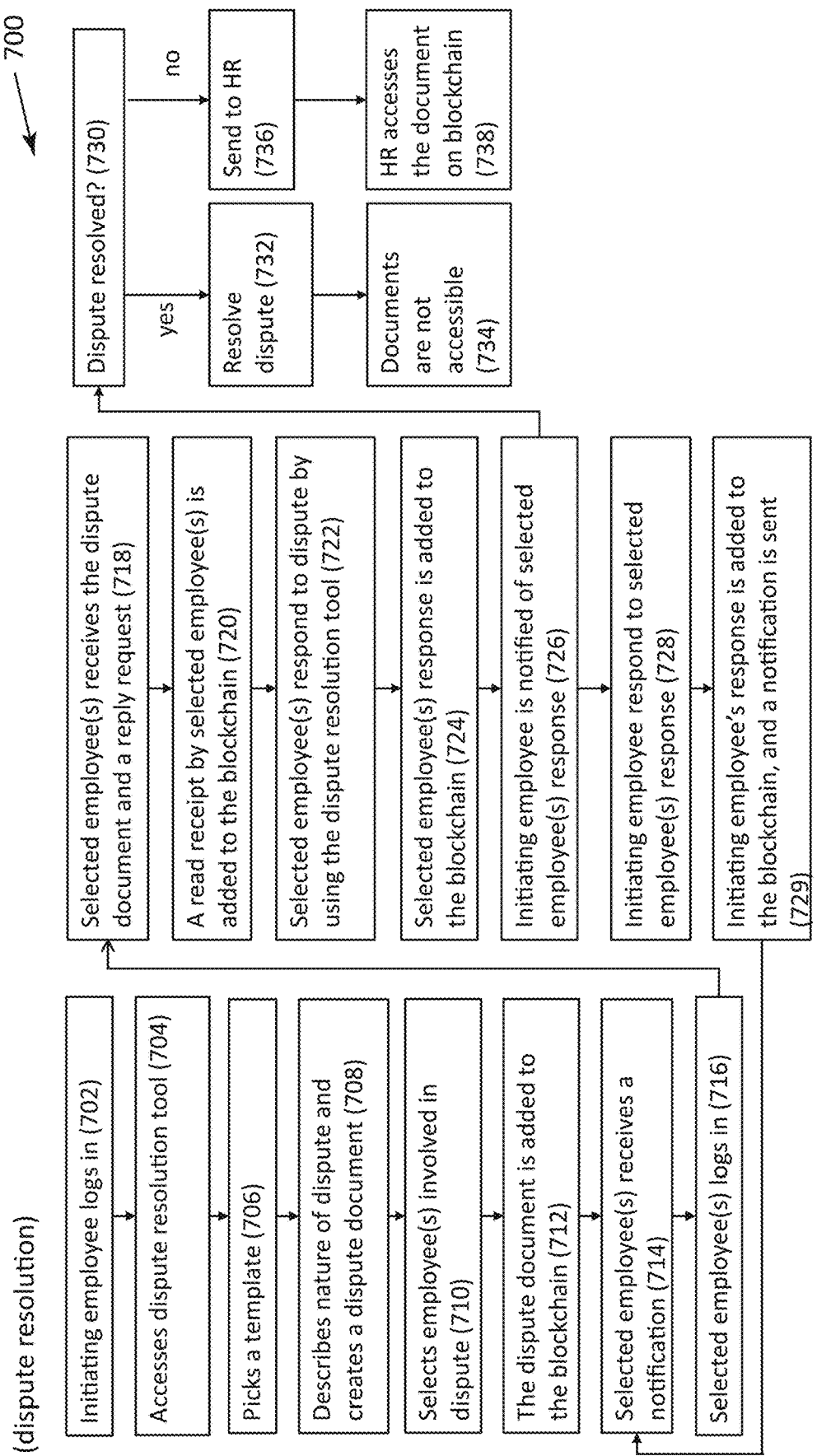
FIG. 7 is a block diagram illustrating a dispute resolution process of a Document Creation system according to an embodiment of the invention.

FIG. 7 illustrates the steps of a dispute resolution process 700. Process 700 starts with an initiating user logging into the system. (Step 702). Next, the initiating user accesses the dispute resolution tool (Step 704), selects a template (e.g., drop-down menu) (Step 706), fills out the template to create a dispute document that describes the nature of the dispute (Step 708), and selects (e.g., drop-down menu) the user(s) and/or identifies other individuals involved in the dispute (Step 710). The complete dispute document can then be added to the blockchain (Step 712).

Next, each selected user receives a notification about the dispute document (Step 714). The users each log into the system (Step 716), and obtains the dispute document and a reply request (Step 718). A read receipt is created and can be added to the blockchain for each selected user after that user views the dispute document (Step 720).

Each selected user can respond to the dispute by using the dispute resolution tool (Step 722). Each response can be added to the blockchain (Step 724). The initiating user is notified of each selected employee's response (Step 726).

The initiating user may reply to each selected user's response. If the initiating user responds to a selected user, then an initiating-user-and-selected-user loop is created. The next step in the loop is the initiating user responding to the selected user's response (Step 728). The initiating user's response is added to the blockchain, and a notification is sent to the selected user (Step 729). The selected user receives the notification (Step 714) and the loop repeats Steps 716 to 726.

At any time, the users can select/indicate that the dispute has been resolved (Step 730, 732). If the users select that the dispute was resolved (Step 732), then the dispute document becomes inaccessible (Step 734). If the users select that the dispute was not resolved, then the dispute document is sent to HR (Step 736). HR then has access to the blockchain to view the dispute document and all of the responses (Step 738).

Disability Accommodation

Figure 8:
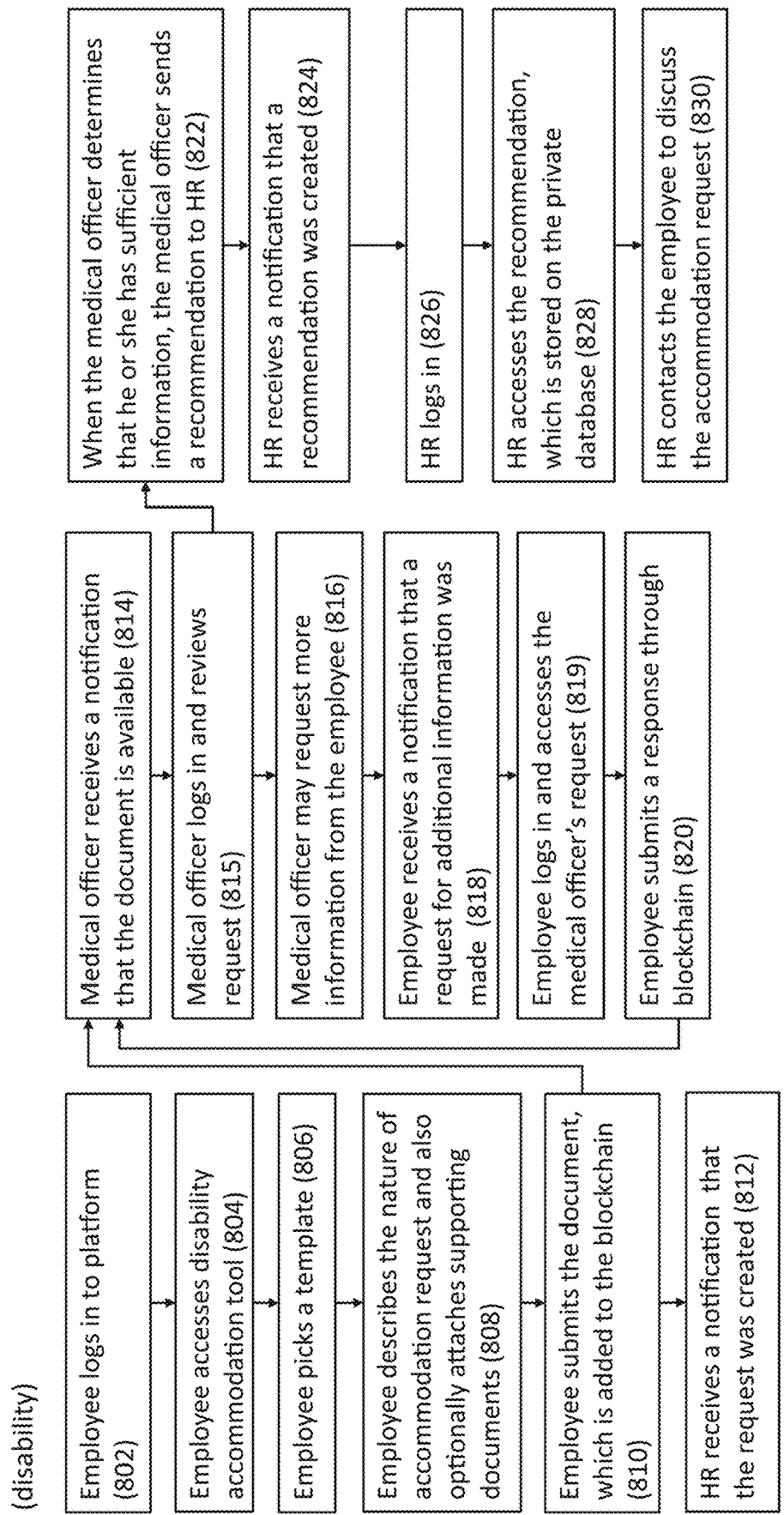
FIG. 8 is a block diagram illustrating a disability accommodation tool of a Document Creation system according to an embodiment of the invention.

FIG. 8 illustrates the steps of an operation of a disability accommodation tool 800. Disability tool process 800 starts with an employee logging into the platform (Step 802) and accessing/selecting disability accommodation tool 800 (Step 804). Next, the employee selects a template (Step 806) and creates a document by completing the template and describing the nature of the accommodation request (e.g., a special chair, key board, bathroom, etc., and optionally attaching supporting documents (Step 808). The employee then submits the disability accommodation document, which is added to the blockchain (Step 810).

HR receives notification that a disability accommodation request was created (Step 812). In addition, a medical officer or other designated individual also receives a notification that a disability accommodation document is available (Step 814). After receiving this notification, the medical officer logs into the system and reviews the request and document (Step 815).

The medical officer determines whether he or she has enough information after reviewing the request and document. If the medical officer determines that he or she needs more information, then a medical-officer-and-employee loop is created. In the loop, the medical officer requests more information from the employee (Step 816). The employee receives a notification that the medical officer has requested additional information (Step 818). After receiving the notification, the employee logs into the system and accesses the medical officer's request (Step 819). The employee then submits his or her response, which is added to the blockchain (Step 820). Next, the medical officer receives a notification that the employee has submitted a response and must log in to view the employee's response. The medical officer then logs into the system and reviews the response to see if the medical officer has sufficient information.

When the medical officer determines that he or she has sufficient information, the medical officer sends a recommendation to HR (Step 822). HR receives the notification that the recommendation regarding the employee's request was created (Step 824). HR then logs into the system (Step 826) and accesses the recommendation that is stored on a private database (Step 828). HR can then contact the employee to discuss the accommodation (Step 830).

Data Storage

Figure 9:
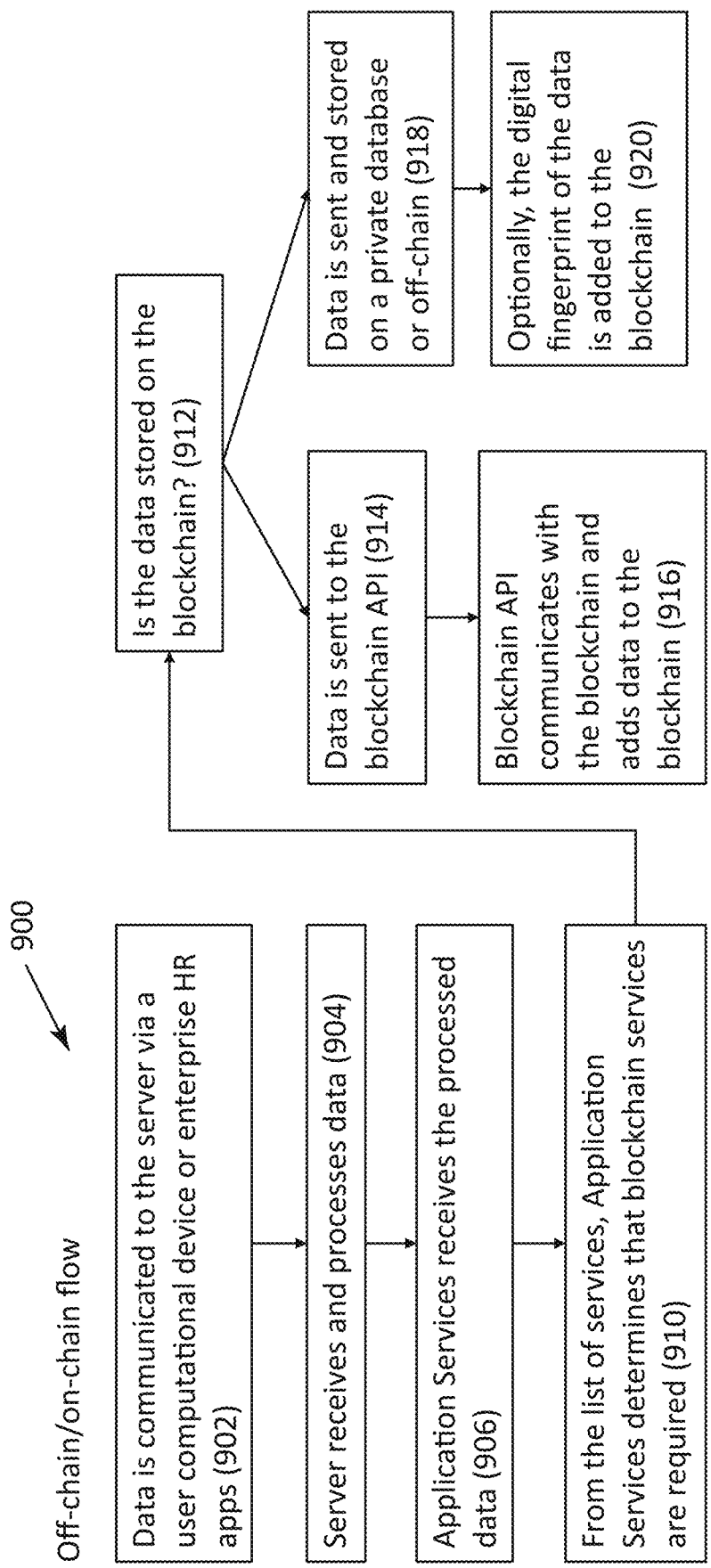
FIG. 9 is a block diagram illustrating data storage either on the blockchain or in a database not located on the blockchain according to an embodiment of the invention.

FIG. 9 illustrates a data storage process 900 for data storage either on the blockchain or in a database not located on the blockchain. Process 900 starts with either user computational device 102 or enterprise HR app 420, communicating data to server 122 (Step 902). Server 122 receives, processes, and sends the data (Step 904) to application services 408. Application services 408 receives the processed data (Step 906). Application services 408 compares the data to a list and of services and determines whether blockchain services are required (Step 910).

Application services 408 also determine whether the data is stored on the blockchain (Step 912). If application services 408 determines that the data must be stored on the blockchain, then application services 408 sends the data to the blockchain API 402 (Step 914). The blockchain API 402 then communicates with the blockchain and adds the data to the blockchain (Step 916).

If application services 408 determines that the data must be stored outside of the blockchain ("off-chain"), then application services 408 will send the data to a private database or a database located off-chain for storage (Step 918). Optionally, the digital fingerprint of the data is added to the blockchain (Step 920).

Artificial Intelligence

Figure 10:
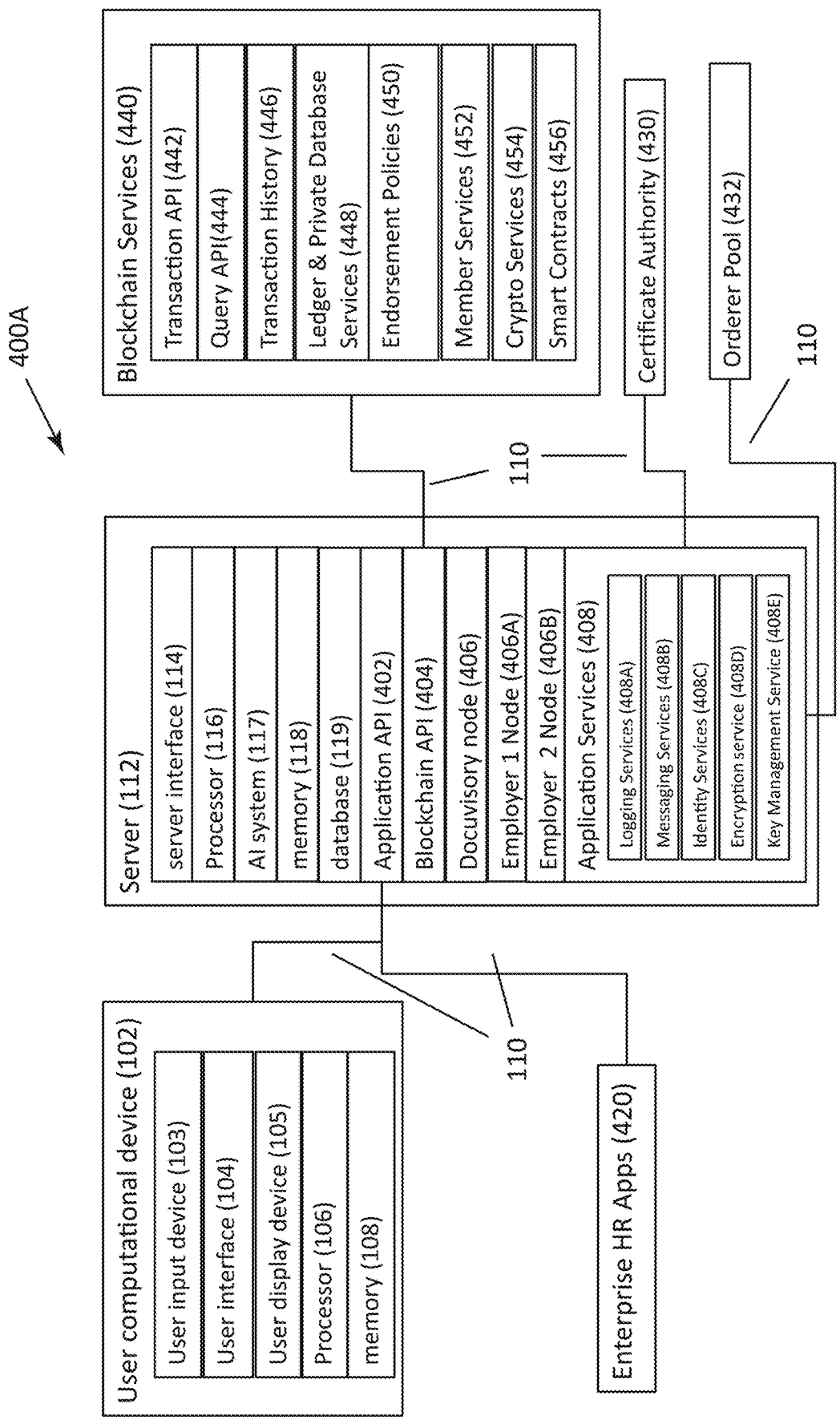
FIG. 10 is a block diagram illustrating another exemplary embodiment of a Document Creation system according to an embodiment of the invention that uses artificial intelligence.

FIG. 10 shows another exemplary embodiment of the present invention that uses artificial intelligence. FIG. 10 contains all the components of FIG. 4A with the addition of an artificial intelligence (AI) system 117. AI system 117 could include machine learning and/or deep learning algorithms or other AI systems.

AI system 117 analyzes documents based on training data. To create the training data, attorneys and other reviewers analyze a set of documents for employment issues and provide their questions, comments, suggestions, and edits. As is well understood in the field, AI system 117 is then trained with training data to analyze documents and to provide its questions, comments, suggestions, and edits. Non-limiting examples of such training data may include, without limitation, documents from supervisors, comments by reviewers (including without limitation deletions, insertions, comments and questions), and the like. For training AI system 117, the data is preferably divided to a training set and a test set. The training set is used to train the system and set the weights for the neurons in the model. The test set may then be used to determine the accuracy of the model.

Optionally, AI system 117 may comprise a plurality of neural networks or models, such that a first model may be trained on one set of data and a second model may be trained on a second set. Also optionally, AI system 117 may comprise (additionally or alternatively) one or more classical machine learning algorithms, which typically require less data.

AI system 117 may also comprise one or more already trained neural network models, for example for sentiment analysis. Sentiment analysis detects words related to emotions and emotional expression, and may be used for example to flag words related to anger and other inappropriate emotional expressions for employment related documents. Such documents are preferably written using objective language rather than subjective language.

Once the AI system 117 is trained, the AI system 117 can analyze documents created by supervisors before or after review by a reviewer. AI system 117 can ask questions and make suggestions and comments. For example, AI system 117 may ask for more supporting facts, such as specific dates, durations or frequencies. AI system 117 can also edit documents by redlining and striking out text, such as words related to emotional expressions, for example.

Supervisors, reviewers, or HR can request comments, suggestions, or edits from AI system 117. Optionally, AI system 117 also can automatically suggest specific language to include or remove from a document while the document is being created or edited. Optionally, a human reviewer, supervisor or HR support person may accept or reject the changes from AI system 117 before a final document is produced. AI system 117 can be used to assist in the review process or to replace the reviewer in the review process described in FIG. 2.

Figure 11A:
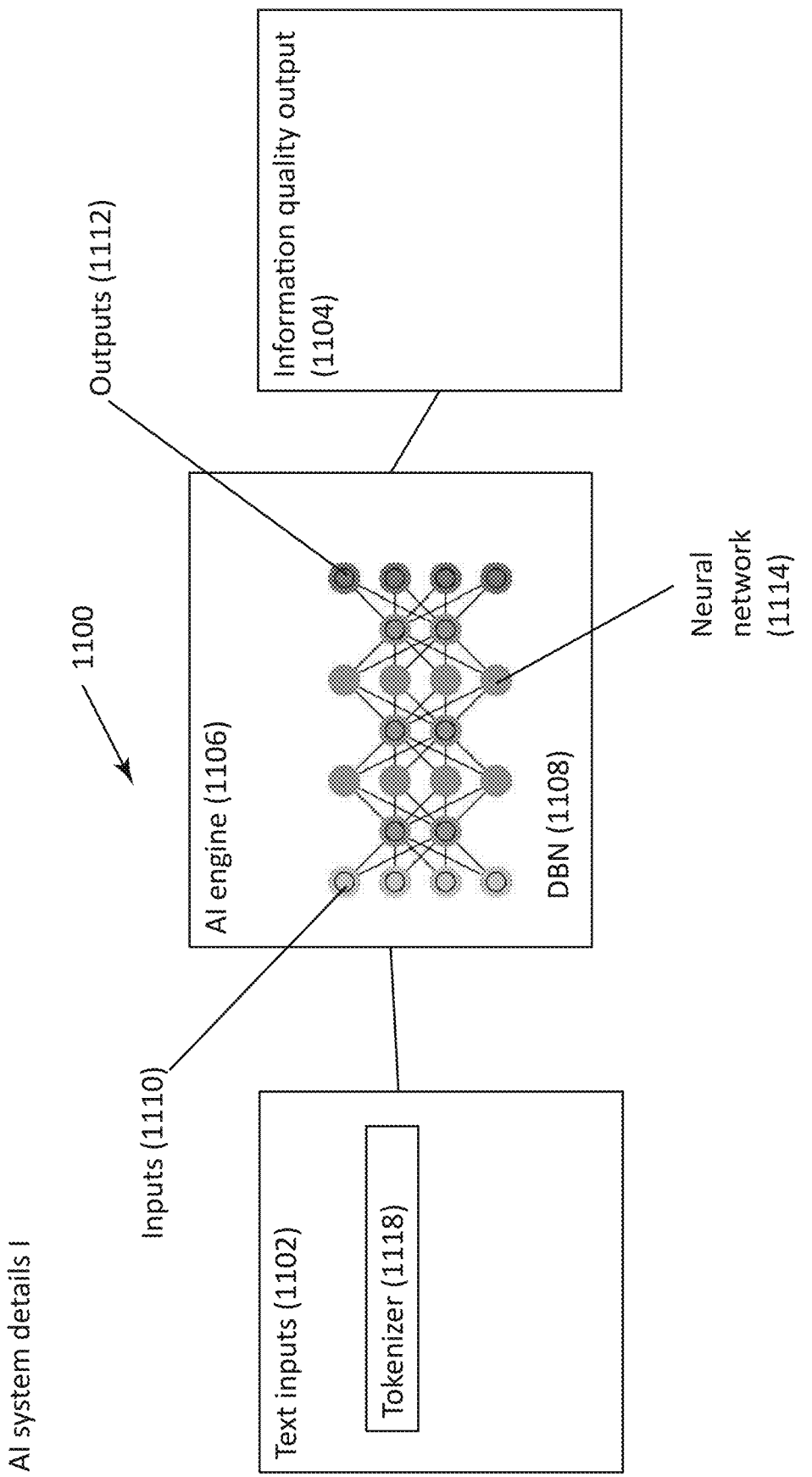
FIGS. 11A and 11B show block diagrams illustrating exemplary systems and flows for providing information to an artificial intelligence system with specific models employed and then analyzing the information.
Figure 11B:
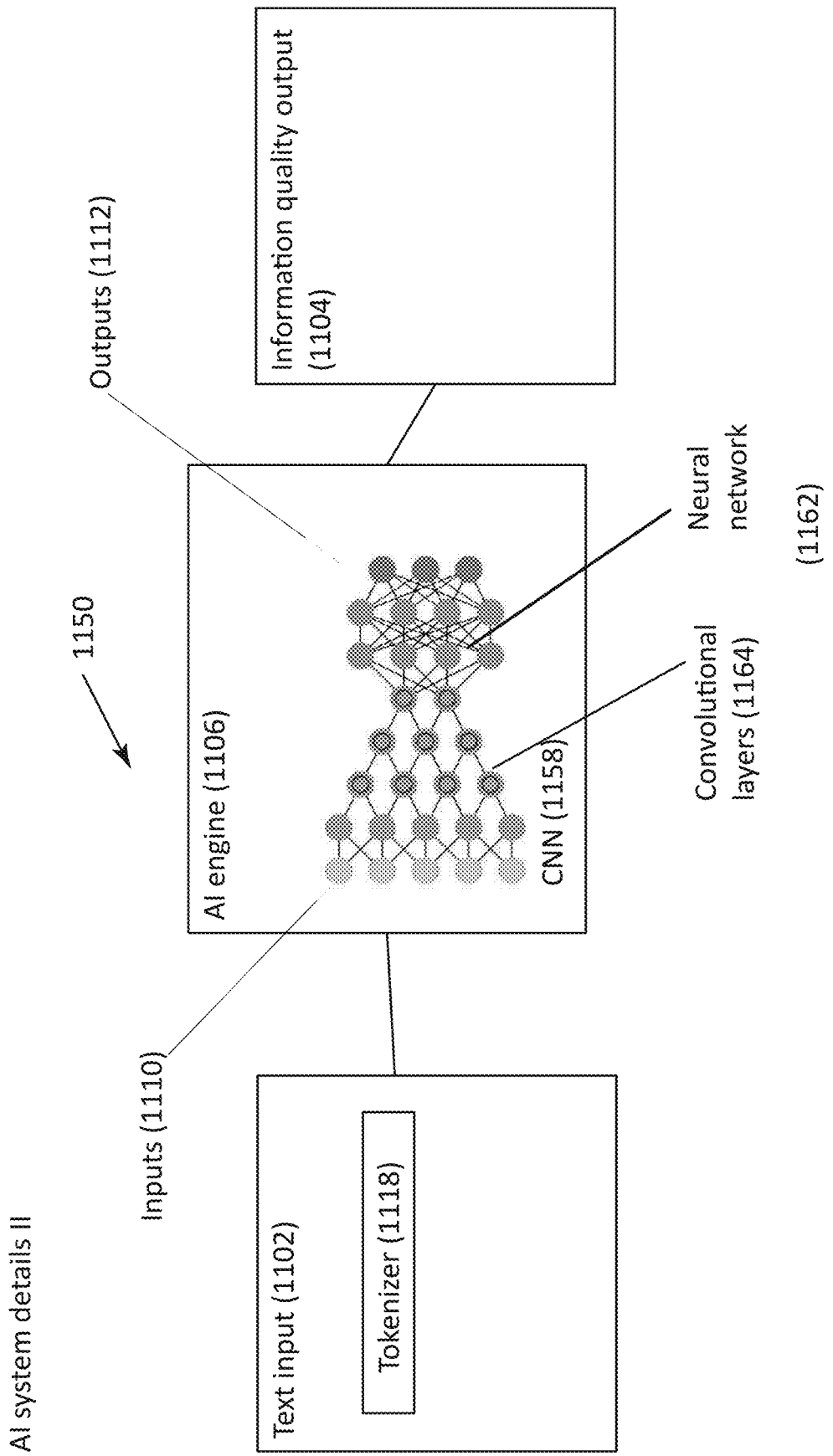

FIGS. 11A and 11B illustrate a pair of non-limiting exemplary systems and flows 1100 and 1150 for providing information to an artificial intelligence system with specific models employed and then analyzing it. Turning now to FIG. 11A, as shown in system 1100, text inputs are provided at inputs 1102 and are also analyzed with a tokenizer 1118. Tokenizer 1118 is able to break down the text inputs into parts of speech. The text inputs may be in the form of a document, for example. By "document", it is meant any text featuring a plurality of words.

Various methods are known in the art for tokenization. For example, and without limitation, a method for tokenization is described in Laboreiro, G. et al (2010, Tokenizing microblogging messages using a text classification approach, in 'Proceedings of the fourth workshop on Analytics for noisy unstructured text data', ACM, pp. 81-88). The entire contents of these publications are incorporated herein by reference.

Once the document has been broken down into tokens, optionally less relevant or "noisy" data is removed, for example to remove punctuation and stop words. A non-limiting method to remove such noise from tokenized text data is described in Heidarian (2011, Multi-clustering users in twitter dataset, in 'International Conference on Software Technology and Engineering, 3rd (ICSTE 2011)', ASME Press). Stemming may also be applied to the tokenized material, to further reduce the dimensionality of the document, as described for example in Porter (1980, 'An algorithm for suffix stripping', Program: electronic library and information systems 14(3), 130-137). The entire contents of these publications are incorporated herein by reference.

The tokens may then be fed to an algorithm for natural language processing (NLP) as described in greater detail below. The tokens may be analyzed for parts of speech and/or for other features which can assist in analysis and interpretation of the meaning of the tokens, as is known in the art.

Alternatively, or additionally, the tokens may be sorted into vectors. One method for assembling such vectors is through the Vector Space Model (VSM). Various vector libraries may be used to support various types of vector assembly methods, for example according to OpenGL. The VSM method results in a set of vectors on which addition and scalar multiplication can be applied, as described by Salton & Buckley (1988, 'Term-weighting approaches in automatic text retrieval', Information processing & management 24(5), 513-523). The entire contents of this publication are incorporated herein by reference.

To overcome a bias that may occur with longer documents, in which terms may appear with greater frequency due to length of the document rather than due to relevance, optionally the vectors are adjusted according to document length. Various non-limiting methods for adjusting the vectors may be applied, such as various types of normalizations, including but not limited to Euclidean normalization (Das et al., 2009, 'Anonymizing edge-weighted social network graphs', Computer Science, UC Santa Barbara, Tech. Rep. CS-2009-03); or the TF-IDF Ranking algorithm (Wu et al, 2010, Automatic generation of personalized annotation tags for twitter users, in 'Human Language Technologies: The 2010 Annual Conference of the North American Chapter of the Association for Computational Linguistics', Association for Computational Linguistics, pp. 689-692). The entire contents of these publications are incorporated herein by reference.

One non-limiting example of a specialized NLP algorithm is word2vec, which produces vectors of words from text, known as word embeddings. Word2vec has a disadvantage in that transfer learning is not operative for this algorithm. Rather, the algorithm needs to be trained specifically on the lexicon (group of vocabulary words) that will be needed to analyze the documents.

This tokenizer information is then fed into an AI engine 1106 and information quality output is provided by the AI engine in a step 1104. In this non-limiting example, AI engine 1106 comprises a DBN (deep belief network) 1108. DBN 1108 features plural input neurons 1110 and a neural network 1114 and then plural outputs 1112.

A DBN is a type of neural network composed of multiple layers of latent variables ("hidden units"), with connections between the layers but not between units within each layer.

FIG. 11B illustrates the framework of a non-limiting exemplary AI system 1150 with similar or the same components as shown in FIG. 11A, except for the neural network model. In system 1150, a neural network 1162 includes plural convolutional layers 1164, neural network 1162, and outputs 1112. This particular model is embodied in a CNN (convolutional neural network) 1158, which is a different model than that shown in FIG. 11A.

A CNN is a type of neural network that features additional separate convolutional layers for feature extraction, in addition to the neural network layers for classification/identification. Overall, the layers are organized in 3 dimensions: width, height, and depth. Further, the neurons in one layer do not connect to all the neurons in the next layer but only to a small region of it. Lastly, the final output will be reduced to a single vector of probability scores, organized along the depth dimension. It is often used for audio and image data analysis, but has recently been also used for natural language processing (NLP; see for example Yin et al, Comparative Study of CNN and RNN for Natural Language Processing, arXiv:1702.011123v1 [cs.CL] 7 Feb. 2017), the contents of which are incorporated herein by reference.

System Architecture

Figure 12:
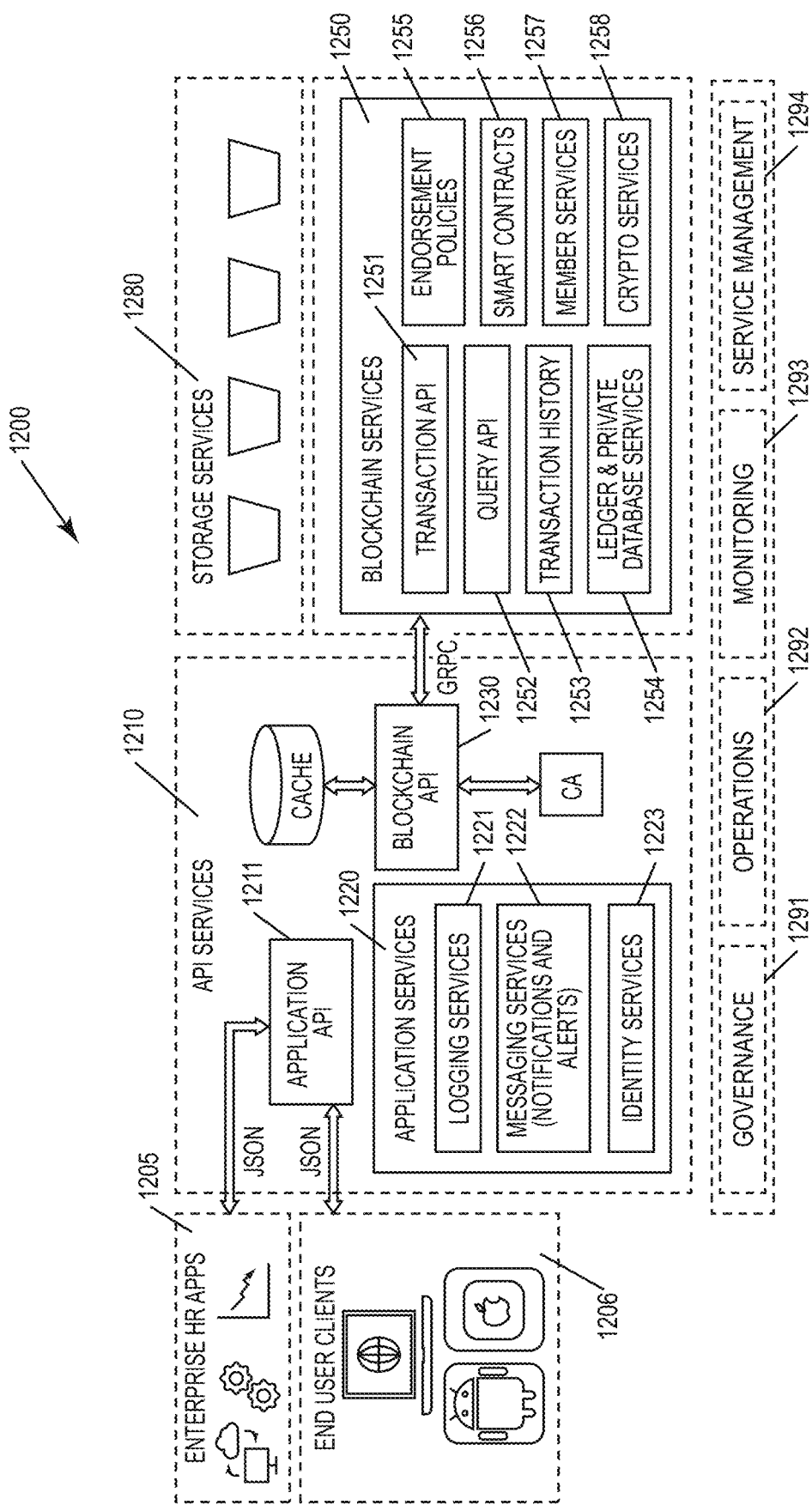
FIG. 12 is an illustration the system architecture of a Document Creation system according to an embodiment of the invention.

FIG. 12 illustrates the architecture of a system 1200 in accordance with preferred embodiments of the invention. System 1200 features an API services 1210, a blockchain services 1250, and a storage services 1280, wherein each service can run on a single computational device or multiple computational devices. Storage services 1280 include "buckets" where the document's permanent and temporary keys are stored. These services may be located in containers that allow the services to run independently of any operating system. Alternatively, these services may run on a virtual machine that uses the computer processing unit (CPU) of the computational device. API As shown in FIG. 12, system 1200 permits interaction between an enterprise HR app(s) 1205 and one or more end user clients 1206 through an application API 1211 of API services 1210. API services 1210 includes an application services 1220, which itself involves a logging services 1221, a messaging services 1222, e.g., for notifications and alerts and an identity services 1223. API services 1210 also contains a blockchain API 1230 having cache and certificate authority (CA) features. The CA issues the signing keys to the user of the system. Blockchain API 1230 is linked to blockchain services 1250, which itself provides the following functions: a transaction API 1251, a query API 1252, a transaction history 1253, a ledger and private database services 1254, an endorsement policies 1255, a smart contracts 1256, a member services 1257, and a crypto services 1258. System 1200 also includes a governance feature 1291, an operations feature 1292, a monitoring feature 1293 and a service management feature 1294.

Figure 13:
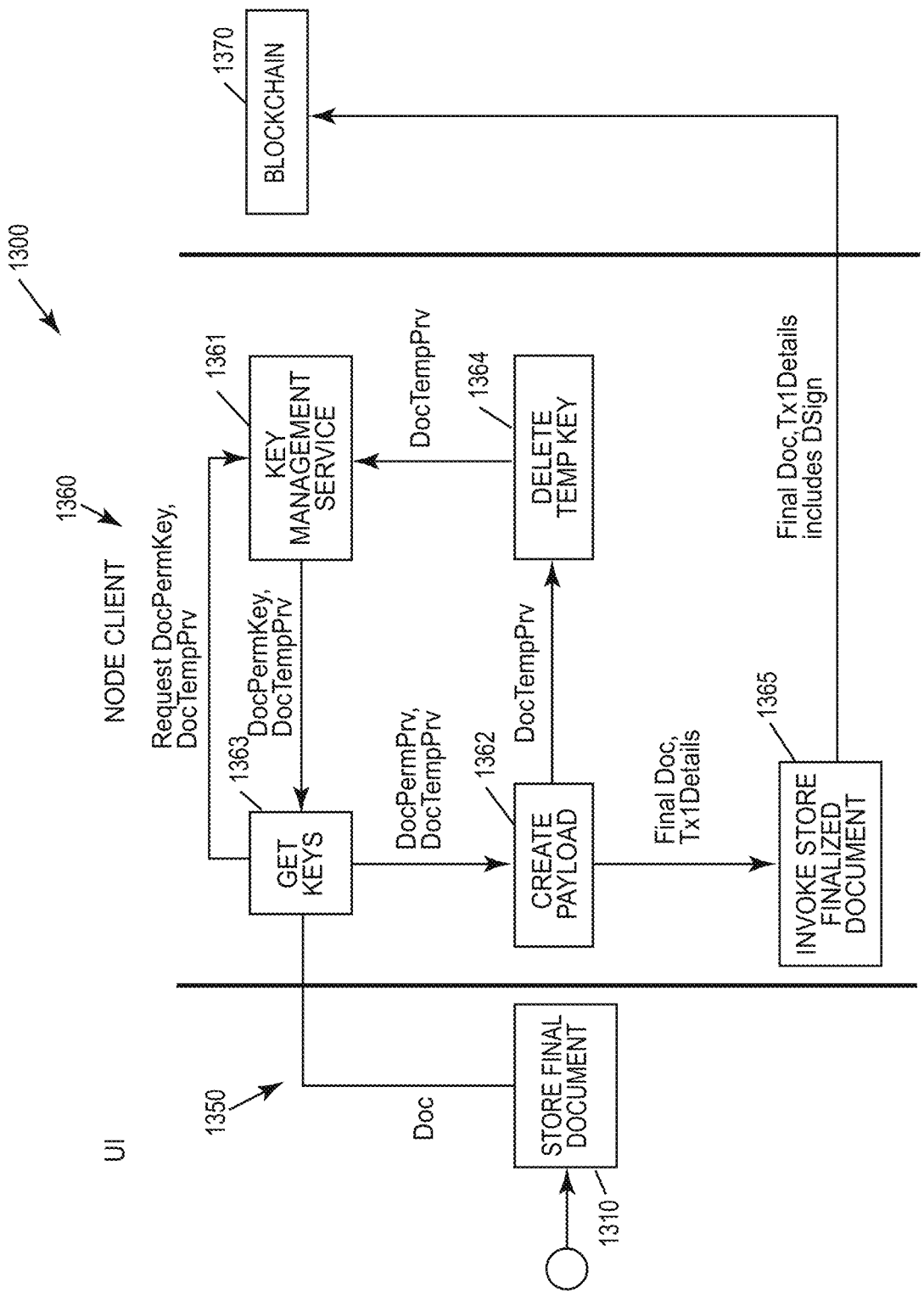
FIG. 13 is a block diagram illustrating the steps of storing a finalized document on the blockchain ledger of a Document Creation system according to an embodiment of the invention.

FIG. 13 illustrates a process 1300 for the storage of a finalized document on the blockchain ledger. As shown in FIG. 13, the user submits a save command 1310 to save the final document. Command 1310 is sent from a user interface 1350 to a node client 1360 of the application server. There, a request 1363 for retrieving the document's permanent public and private key pair and temporary public and private key pair is sent to a key management service 1361. Key management service 1361 returns the keys associated with the final document. Thereafter, a payload 1362 is created. A request to delete the temporary key 1364 is sent to the key management system. The final document and the Transaction 1 details (Tx1Details) are then invoked. The final document, Tx1Details, and digital signature are sent to the smart contract for storing the finalized document on a blockchain ledger 1370.

Deletion of Non-Finalized Documents

Figure 14:
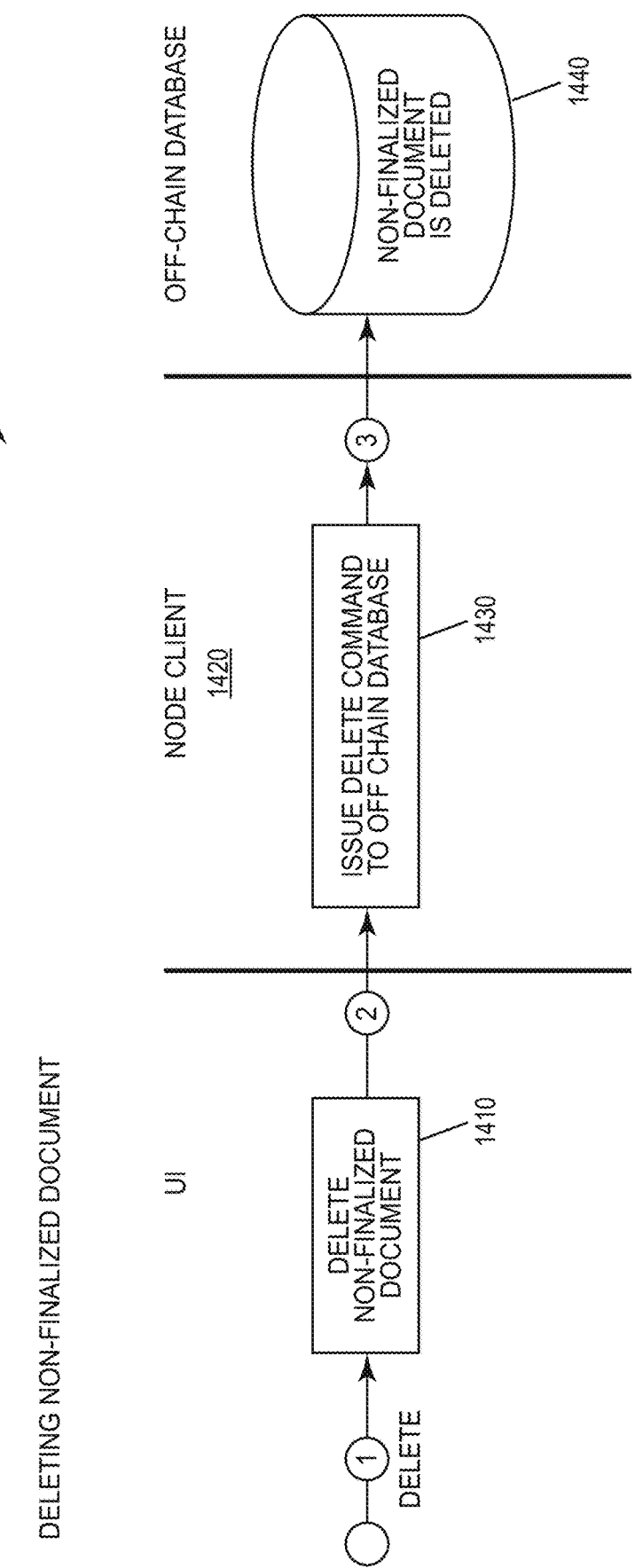
FIG. 14 is a block diagram illustrating the deletion of non-finalized documents on the blockchain ledger of a Document Creation system according to an embodiment of the invention.

FIG. 14 illustrates the steps of a deletion process 1400 for the permanent deletion of non-finalized documents. As shown in FIG. 14, when the user finalizes a document, the draft non-finalized document stored on an off-chain database is deleted. The user interface sends a deletion request 1410 to a node client 1420 of the application server. Next, the node client receives the request and issues a deletion command 1430 to delete the non-finalized document. The non-finalized document is deleted 1440 from the off-chain database. When the document is encrypted, the encryption key is also deleted to make recover more difficult.

EXAMPLES

Aspects and embodiments of the invention will be exemplified in the following nonlimiting examples, provided for purposes of illustration.

"Document System" platforms for implementing the systems and methods in accordance with the invention discussed herein can be web-based or otherwise. After an employer acquires access to the system, via server installation, cloud access or otherwise, the first step in implementing Document Systems in accordance with the invention can involve registering all employees and contractors as users. This preferably involves associating a unique employer assigned email address with a status, such as employee, contractor, supervisor, reviewer, HR, HR reviewer, administrator, hotline recipient and so forth. This will direct which employees create, receive and review the various types of documents discussed herein.

Performance Documentation

The systems and methods described above for facilitating the formation, communication, and management of documents is particularly well suited for documenting employee performance or conduct. Many employers consider it important to document their workers' performance. However, many employers have difficulty locating such documentation when needed and/or ensuring that the documentation was prepared in a suitable and useful manner. Difficulties can occur because the supervisors that are responsible for creating such documentation commonly do not receive proper training or supervision on how to create the documentation. Accordingly, it can be valuable to provide a computer implemented (e.g., server or cloud-based software) system to help standardize the process. Additionally, employers need assistance storing, accessing, searching for and retrieving the documents in a suitably accessible manner. Document creation systems and methods in accordance with the invention ("Document Systems") can assist companies in creating, retrieving, accessing and storing performance evaluation documentation.

A first step in creating performance evaluations in connection with preferred embodiments of the invention is to identify users. One preferred way of identifying users is with their assigned unique email address. If the employer desires to have third-party contractors, such as outside counsel or Human Resource specialists participate in the documentation system in accordance with the invention, also using a unique email. The Document System users are assigned different levels of responsibility and access by the user company. For example, one level of responsibility can be assigned "Employee", "Contractor" "Administrator", "Supervisor", "Reviewer", or "HR", "HR Reviewer", and/or "Hotline Recipient"status. Users may hold more than one role simultaneously. In one embodiment of the invention, supervisors can create performance documents with respect to the non-supervisor employee Creating a Document In preferred embodiments of the invention, when a user with supervisor status logs in to their platform, they will land on their home screen, which will show their Document System Inbox. The Document System In-box can contain communications that need to be acted on. The Document System home screen can also display a Filed box, which can contain notifications that they have already acknowledged or hotline submissions that they have created, as discussed below. (Additionally, the Filed boxes of users who have "HR" status will also show the finalized communications for the employer's workforce).

Figure 15:
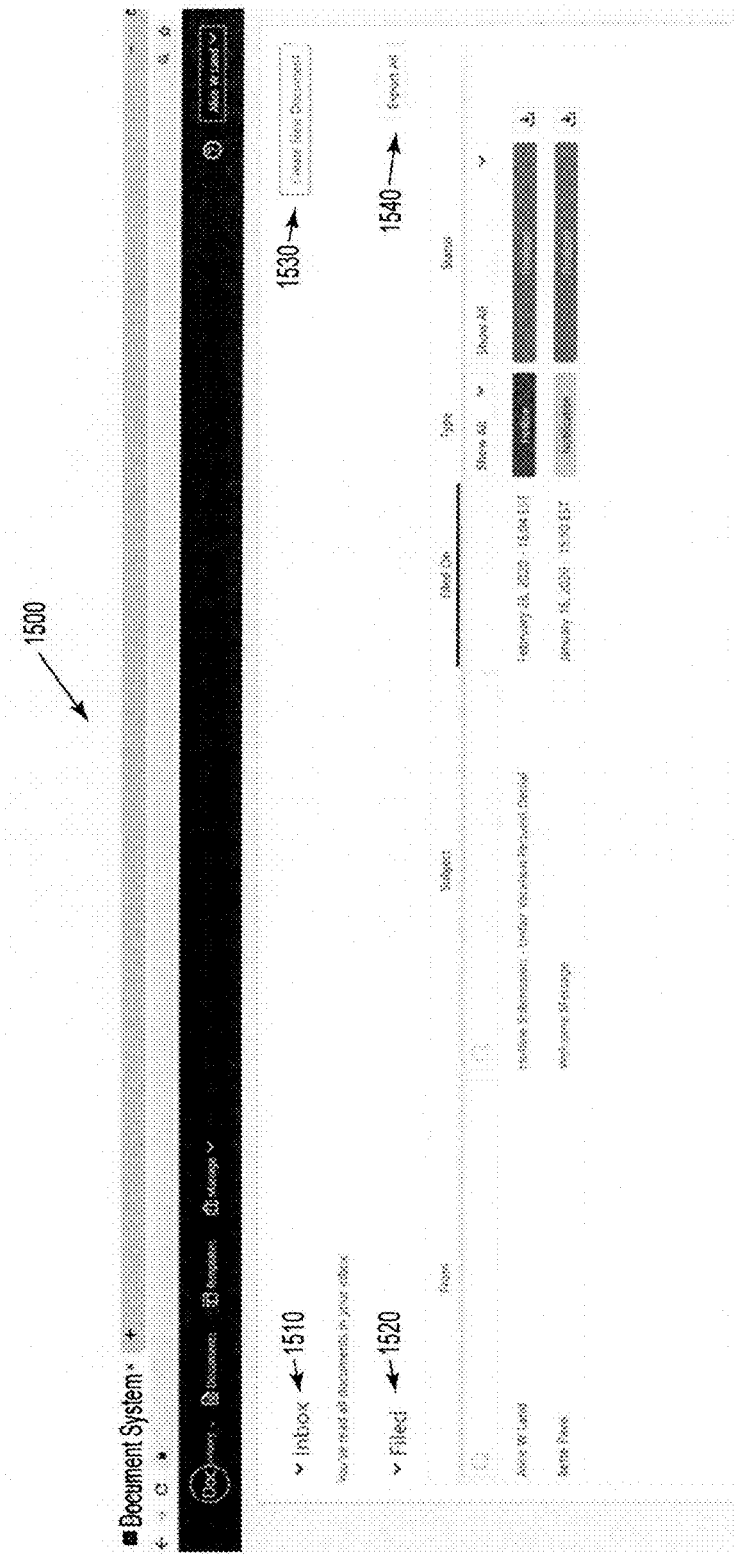
FIG. 15 shows an example of a home screen for use in accordance with a document system in accordance with the invention.

An example of a home screen for use in accordance with Document Systems in accordance with the invention is shown generally as a home screen 1500 in FIG. 15. Home screen 1500 is for use by an employee with the fictitious name Alice W Land and includes an inbox drop-down menu 1510 and a filed drop-down menu 1520. Home screen 1500 also includes a "create new document" button 1530 for creating new documents and an export all button 1540.

If a Supervisor wants to create a new document about a user, such as a performance review or comment, they click Create New Document button 1530. This will present a drop-down menu 1531 (FIG. 16) providing the opportunity to select a document template type, such as a "Document". A dropdown menu for an administrator could also show "Hotline" and "Notification. After the type of document is selected, a drop-down menu 1532 (FIG. 17) is provided for the Supervisor to choose a template of optional documents. Examples of templates could include "Absenteeism/Lateness", "Code of Conduct Violation", "Nice Job", "Performance Evaluation/Coaching for the Future (with rating)", or "Performance Issue". Employers can also customize and create templates to suit their organization's needs.

Figure 18:
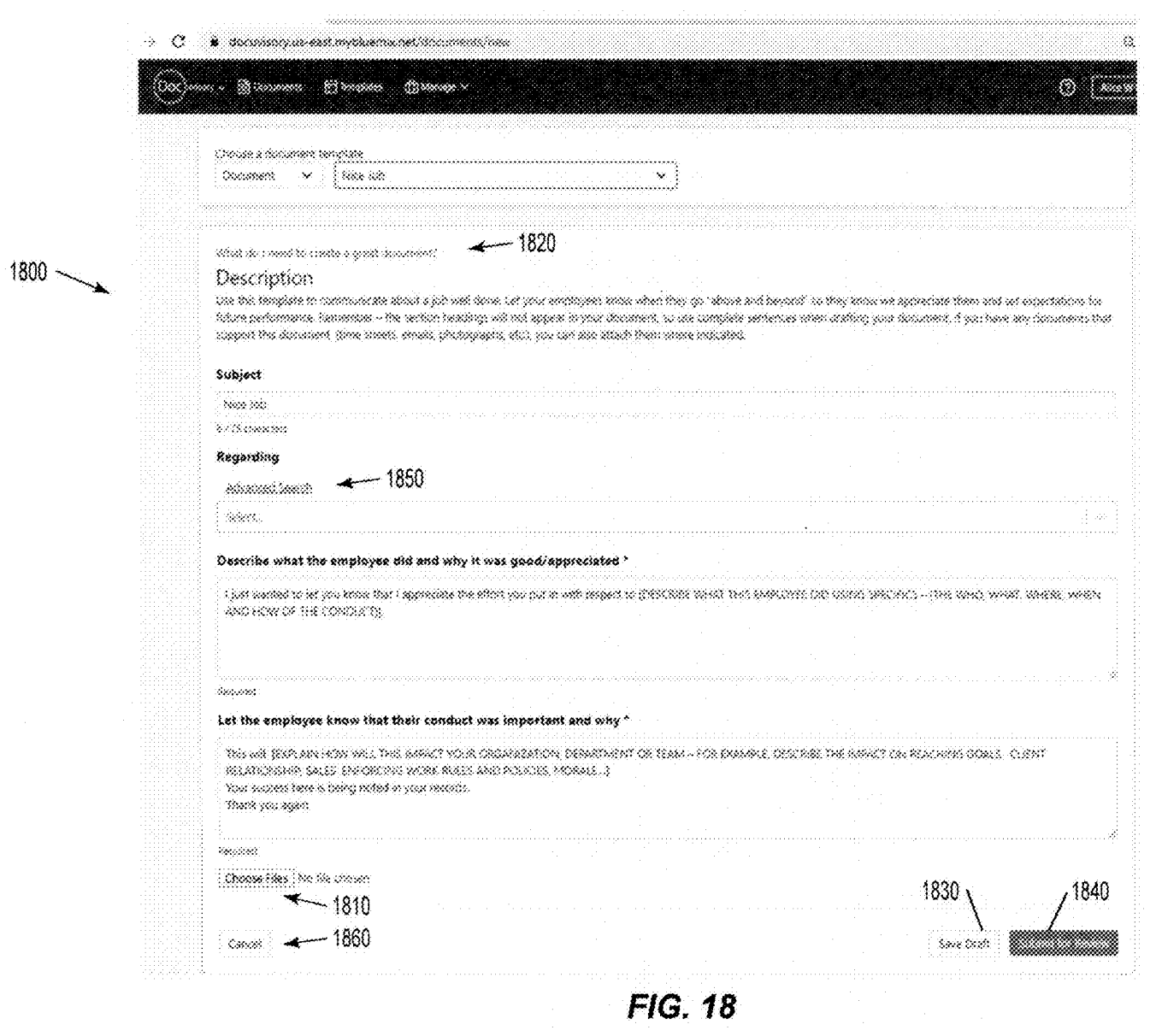

As shown in FIG. 18, if, for example, the Supervisor selects the Nice Job template, a Nice Job template 1800 will be displayed. Nice Job template 1800 includes prompts for information, such as the subject and a description of what the user did and why it was beneficial and appreciated. For example, the subject might read "Nice job rolling out new procedures to manage software upgrades." Another prompt can be to let the employee know that their conduct was important, and why. A button 1810 can be provided to attach materials, such as emails, timesheets, pictures, etc. A hot link 1820 can be included to provide the Supervisor with additional, general information about how to create the most useful and appropriate document. Template also includes a save button 1830 and a Submit for Review button 1840.

A search feature 1850 is provided to select the particular user that will be the subject of the template. Search features can include searching by first name, last name, and/or email and can allow a Supervisor to select from the employees that match the search.

The prompts on the template provide guidance about the type of information that should be included in each field and can suggest sample language to give further guidance. Supervisors can either use the sample language or change the sample language and type their own content to respond to a prompt for a particular field. For example, prompts might suggest that the supervisor include the who, what, where, when and how of the conduct.

Save button 1830 provides supervisors with the ability to delay completion of a document and save it for later completion. After a supervisor decides that they have finished filling out the template and creating the document, they can select Submit for Review button 1840. Optionally, they can delete the draft by clicking on a cancel button 1860.

One user (under most circumstances) (employee or contractor) per employer will be given the designated role of "Reviewer." Contractors include outside counsel and consultants. Another option is to have only one email address for this position, but for multiple individuals to have access to that address. When a Supervisor submits a Document for review by selecting Submit for Review button 1840, the Document System platform will send an email to the Reviewer at the email address provided when the Reviewer is registered as a user. The email will alert the Reviewer that a Document System communication requires their attention and prompt the Reviewer to log in to their home page.

Figure 19:
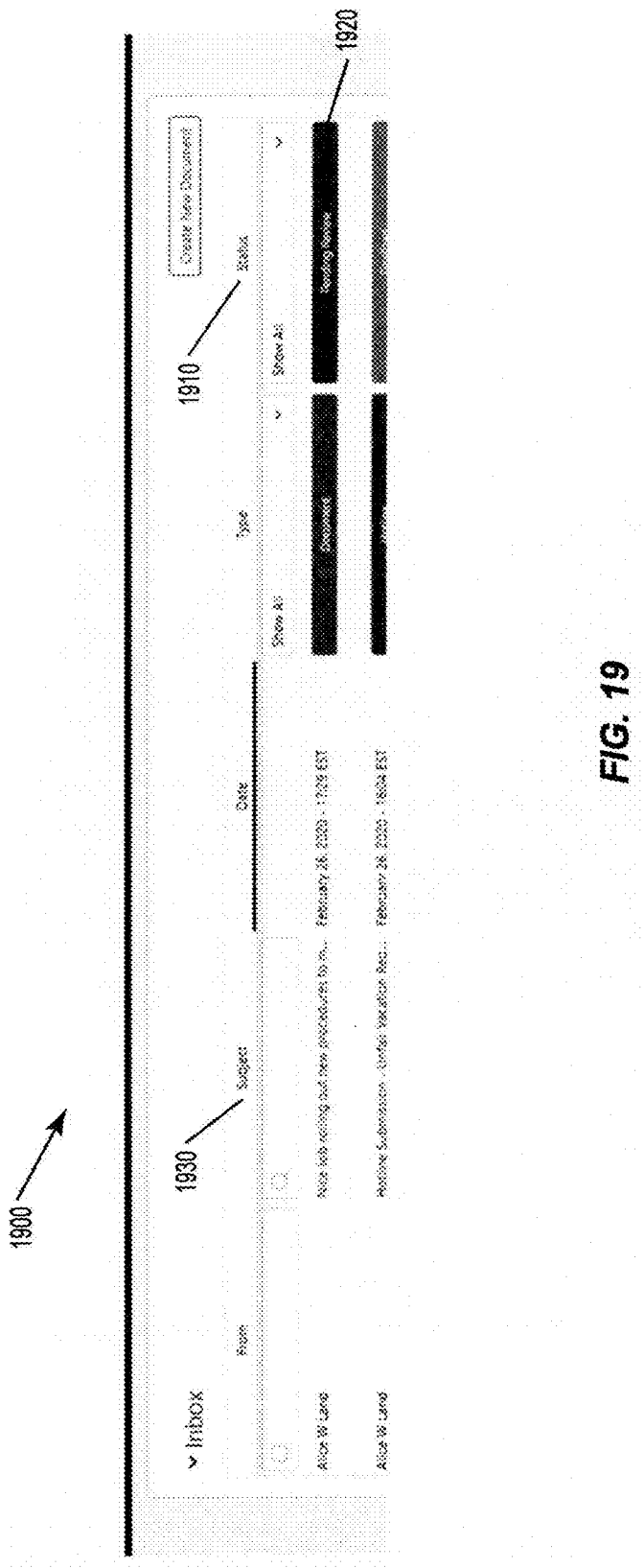
FIG. 19 shows an example of a user inbox for use with a system in accordance with the invention.

As shown in FIG. 19, when a Reviewer logs into the Document System, they can see a Document in their Inbox 1900 with a Status 1910 of "Pending Review" 1920. The Reviewer can open that document by clicking on its subject 1930. In the example shown in inbox 1900, the subject is "Nice Job rolling out new procedures to m . . . ".

Figure 20:
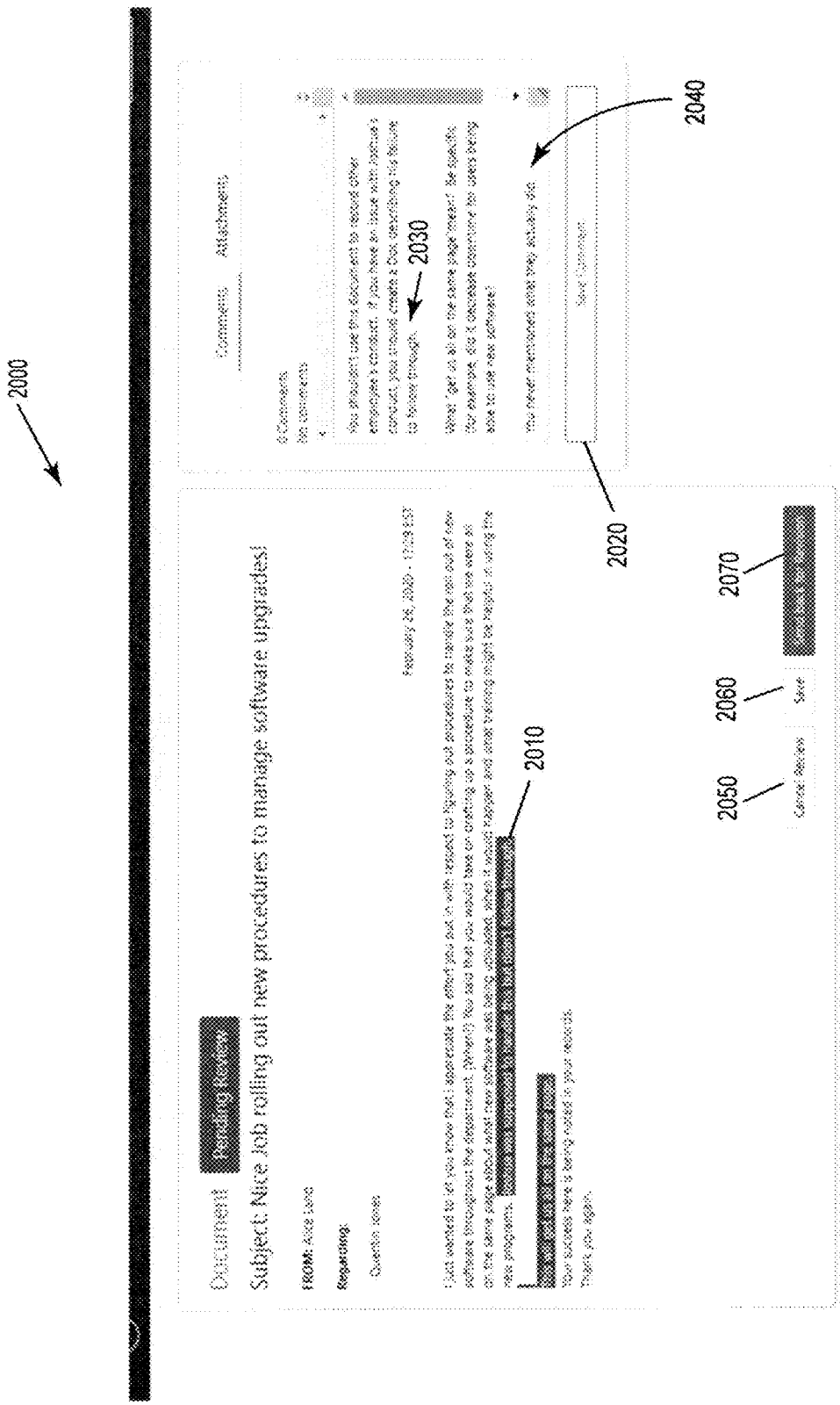
FIG. 20 shows an example of a screen for providing comments in accordance with an embodiment of the invention.

As shown in FIG. 20, when the Reviewer opens the Document, they can read its content. They can also access any attachments to the Document. If they choose to review the Document, they can make suggested edits to the Document by editing its text. A Reviewer can also make comments or send questions back to the Supervisor. For example, the Reviewer can suggest edits to a sentence in the draft document (2010) and in a comments section 2020 add a comment 2030 with respect to the highlighted text. The comments can, for example, include a suggestion 2044 that the Supervisor include additional information in the document. The Reviewer can either click a Cancel Review button 2050 to delete the edits to the draft or save the draft for completion at a later time by clicking a save button 2060. The Reviewer can send the document back to the Supervisor by clicking a "Send back for Revision" button 2070, so that the Supervisor can address their comments, questions and/or proposed edits.

When a Reviewer clicks Send back for Revision 2070, the Document System platform sends an email to the Supervisor, indicating that a Document System communication requires their attention. When the Supervisor logs in to the Document System, they can see that they have received a draft Document that requires their attention, in their Document System Inbox, which can be similar to inbox 1900. The Supervisor can click on the communication to open it and see the comments or questions made by the reviewer. They can then click on a "Revise" button and edit the Document. For example, the Supervisor can accept or reject the edits and/or edit the text and respond to the Reviewer's suggestions, comments and questions. They can also add comments or questions for the Reviewer.

When the Supervisor finishes their revision, they can click a Submit for Review button, similar to button 1840 of screen 1800, to re-submit their Document to the Reviewer. The Reviewer will receive another email, indicating that a Document System communication requires their attention. They can then log into the Document System platform and open the document, using the same procedure that was used when the Supervisor initially sent the document. They can see the attachments and any comments entered by the Supervisor and their own previous comments. If the Reviewer still cannot approve the document, they can make comments and suggestions and send the document back for revision by the Supervisor, in the same manner as discussed above. This process can be repeated until the Reviewer is satisfied that the document is acceptable. Once the Reviewer approves the draft document, they can send the approved document to Human Resources Reviewer (HR Reviewer) for an additional level of review and finalization. The system can automatically send the document to the HR Reviewer by clicking on a <Send to HR> button. In preferred embodiments of the invention, an additional HR Review is required before a document becomes a "Finalized Document".

The HR Reviewer is an individual responsible for the final review of Documents that have been approved by a Reviewer, and finalizing the documents. Finalized documents are no longer considered draft documents and are preferably recorded onto the Blockchain.

One user per employer who has been designated as holding an HR role should also hold the status of "HR Reviewer" After the HR Reviewer reads the Document and any attachments, if they do not find it to be acceptable, they can send questions, comments and suggested edits to the Supervisor in the same manner that the Reviewer did, by clicking on the "Review" button. If the HR Reviewer sends the document back to the Supervisor for review, the Supervisor will receive an email alert, which can prompt them to access the draft document in the same manner as discussed above. This process can be repeated until the HR Reviewer approves the draft Document by clicking on a "Finalize" button.

Figure 21:
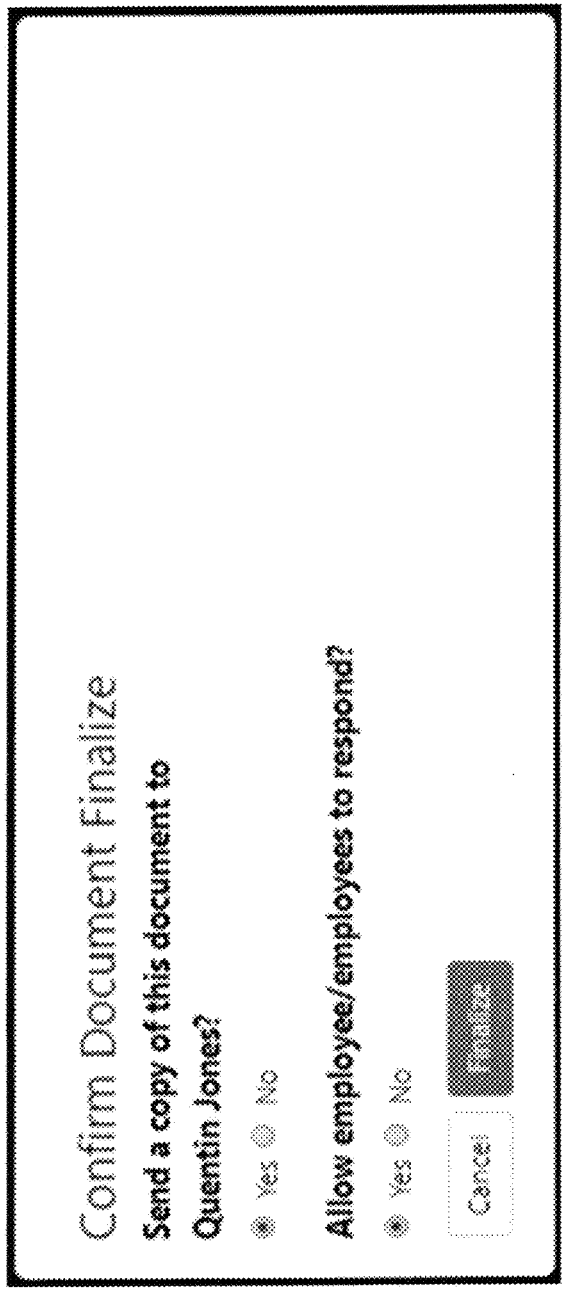
FIG. 21 shows an example of a screen relating to finalizing a document in accordance with an embodiment of the invention.

In preferred embodiments of the invention, after clicking the "Finalize" button, the Document System provides the HR Reviewer with a window to determine the access that the user who is the subject of the document will have with respect to the document. First, they select (e.g., via radio buttons) whether or not the user who is the subject of the document will be permitted to see the document. If the HR Reviewer selects permitting that user to see the document, they must also answer a question determining whether that user will be allowed to respond to the document. See FIG. 21.

If the HR Reviewer determines that a worker can see a Document written about them, the worker will receive an email alerting them that a Document System communication requires their attention. When that worker logs into the document System platform, they will see that a document is in their inbox. The worker can select and open the document to review it. An "Acknowledged" button is be provided and the worker must acknowledge receipt of the document by clicking that "Acknowledged" button. The worker will continue to receive emails until they acknowledge receipt. If the worker is given the ability to respond to the document, text space will be provided to respond, after acknowledging receipt. The worker also has the ability to include attachments with the response, such as with an attachments button. The worker can either provide a response in the space provided or click a button indicating that they decline to respond. If the worker selects Decline to Respond, they can receive a warning message confirming that they be choosing to decline, they are declining the opportunity to respond to the document.

If a worker who was been given the opportunity to respond acknowledges receipt of the document, but fails to respond or complete the response within a selected number of days, the Document will be marked as "Declined to Respond". The worker can be notified of this time limit in the email alerting them that a document requires their attention. The information about that time limit is preferably included in the email notifying the employee that the document requires their attention.

When a worker completes their response, they can click a "Submit Response" button. Their response can be added to immutable records, and the Document's status can be marked as "Finalized".

In embodiments of the invention, any user with HR status can see all finalized communications for the entire workplace, in addition to the communications they received directly through the platform. These communications will be available through their Document System Inbox. If an HR user wants to search for finalized communications, they can do so with filtering functions in their Filed box. Optional filters include, as an example, individual names, dates, subjects, types, recipients and customized fields created by the employer during the system's set up procedure.

An HR User's "Filed" box can also highlight whether any responses or acknowledgments are missing or whether any users have failed to respond to or acknowledge performance documents. The Document System platform can also send daily reminders to users who have communications in need of attention. HR Users can also "push" reminders by locating communications and clicking on a "remind" button for that communication. Reminders can be sent to individuals or groups.

One important feature of preferred embodiments of the invention is the permanent deletion of drafts. A Document created by the Document System is considered a draft until the HR reviewer marks it as finalized. All drafts and comments thereon should be irretrievably deleted. One way to accomplish this is to encrypt all drafts, associate the encryption key with the document and store all drafts in a specific location (container) on the computer system. When the document is marked Finalized, is stored in a different location and the original encryption is eliminated. After marking a draft document a finalized document, the Document System automatically deletes all drafts and related comments. In preferred embodiments of the invention, the encryption key is also deleted or its association with the draft is eliminated. This makes it effectively impossible to reclaim the deleted drafts after a Document is Finalized.

Hotline Submission Tool

Figure 16:
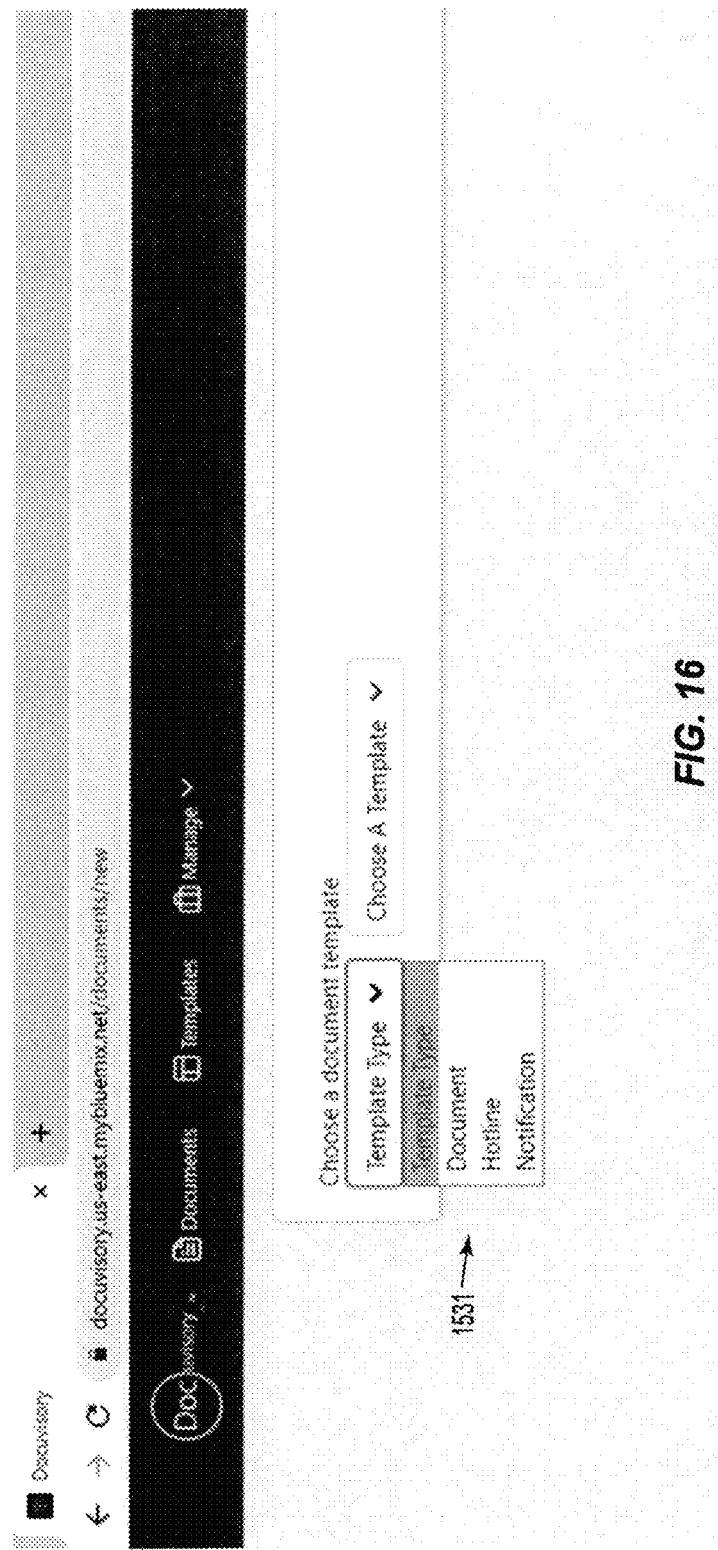
FIG. 16 shows an example of a drop-down menu for use in the screen of FIG. 15.
Figure 17:
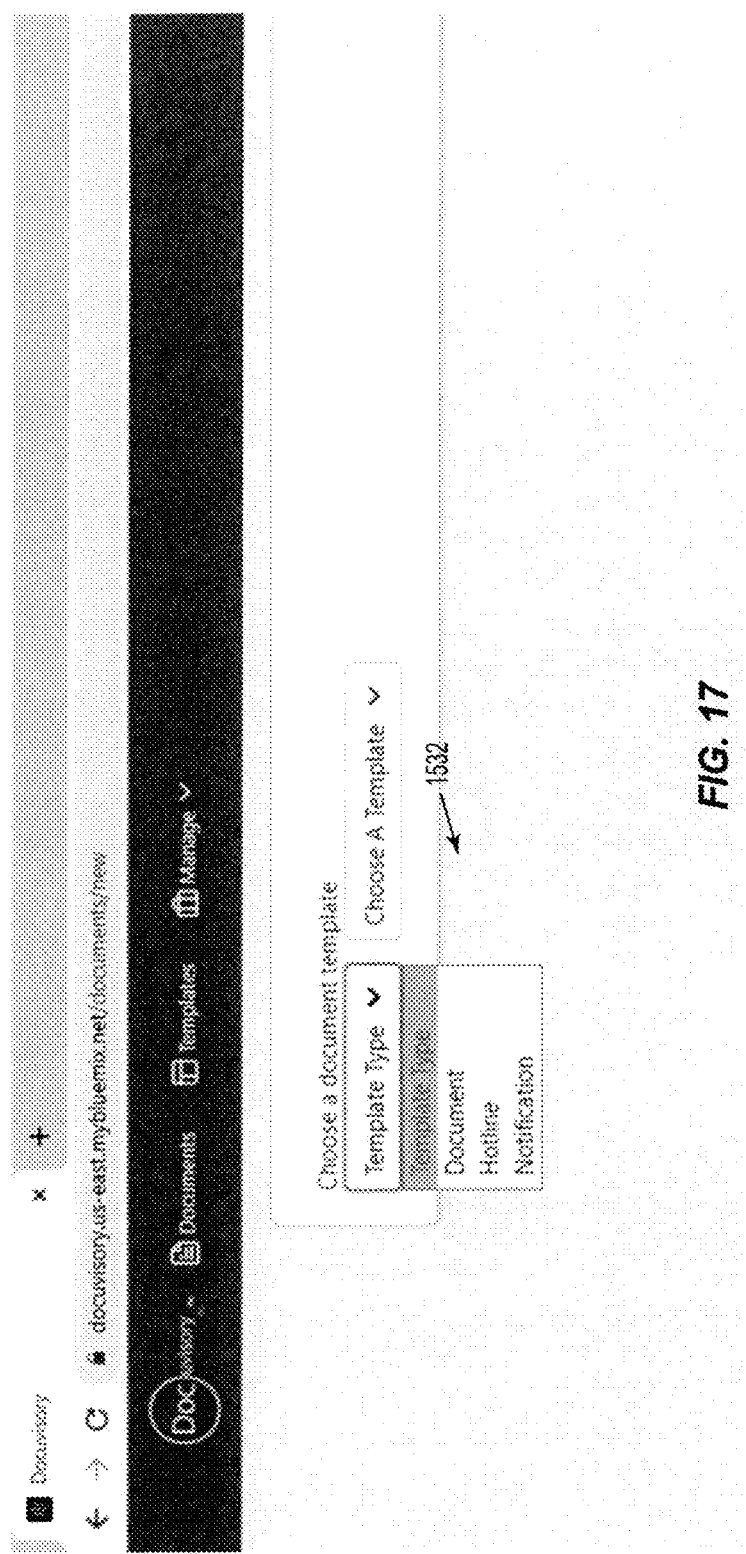
FIG. 17 shows an example of a drop-down menu to choose a template of optional documents.

It can be advantageous for employers to provide a Hotline mechanism, to formalize procedures for making complaints, raising issues for discussion, making suggestions and/or ensuring that employees understand how to register complaints. The system provides a Hotline submission process, in which users can submit hotlines, which are accessible to all users who hold "HR" roles (in their Filed boxes) and are received by users who are designated as "Hotline Recipients". If an employer is utilizing the Hotline tool, all users can access the Hotline tool from their home screen. As discussed above, the home screen contains a Create New Document button 1530 that provides a template type drop-down menu 1531 (FIG. 16). One option in menu 1531 is a Hotline submission. If Hotline is selected, the Document System can provide a drop-down menu with different pre-loaded templates for one or more types of Hotline submissions, similar to dropdown 1532, but with Hotline category topics. One of the options can be "General" or "Other".

Figure 22:
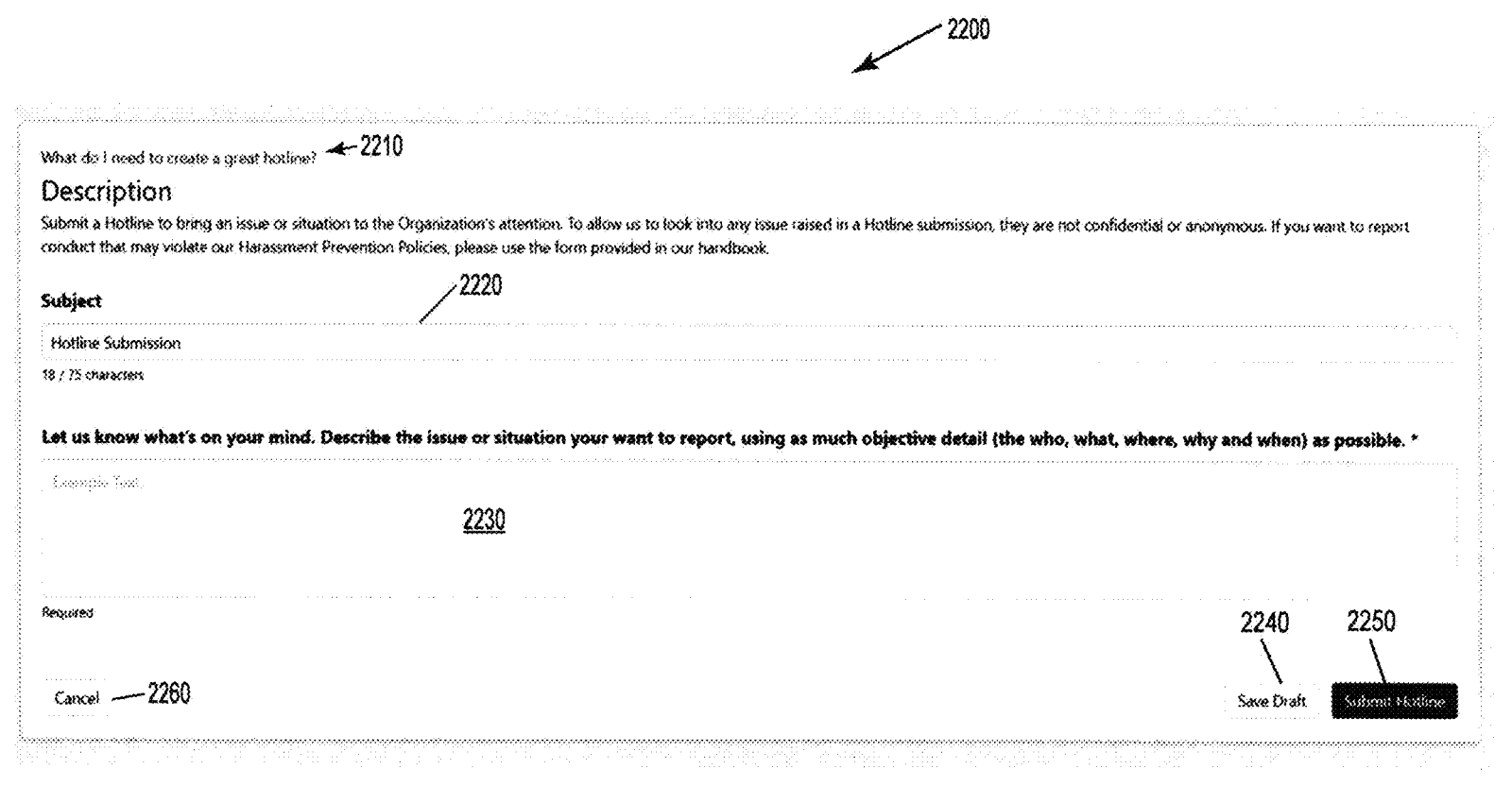

As shown in FIG. 22, a Hotline submission template 2200 allows the user to easily prepare and send the information to the employer. A Hotline instruction hot-link 2210 can be included to provide general information about how to create an effective Hotline submission. Hotline Template 2200 can include text space for the user to describe an issue to bring the issue or situation to the organization's attention, and to allow the organization to investigate the issue. Template 2200 can indicate or provide options for whether or not the submission is confidential and can contain references for particular situations to the employee handbook. For example, Template 2200 can indicate that certain situations are not suited to be the subject of a Hotline submission, and instead require a procedure outside the system.

Template 2200 can include a subject space 2220 and a description space 2230 for the user to describe the subject of the submission and describe the situation. Template 2200 includes a save button 2240 to permit a user to save an incomplete Hotline submission for completion at a later time and a submit button 2250, for when the employee wants to submit their Hotline submission, and a cancel button 2260 to delete a draft Hotline submission.

Hotline templates in accordance with the invention can include prompts and sample language regarding particular situations such as "my supervisor always gives the good shifts to other employees that he considers to be his friends"; "my supervisor only gives the good shifts to women and the men get stuck with the rotten hours"; or "if we added flex-time, we would see a jump in productivity".

After a user clicks on Submit button 2250, they can be provided with a confirmation window, requesting that they confirm that they want to submit the Hotline submission. Once submitted, the Hotline submission is finalized and an immutable record of it is created. It can be accessed by the submitting user in their Field box. It can also be accessed by users who hold an HR role in their Filed box.

Users that have been assigned the status of "Hotline Recipient" will receive an email, notifying them that a Document System communication requires their attention after a Hotline submission is submitted. The Hotline Recipient can then log into their Document System platform and see that a Hotline submission is in their inbox, with a status of Finalized. Organizations can utilize different procedures for reviewing and acting on Hotline submissions.

Notification Communications

It is often necessary for employers to distribute information, such as policies and policy updates, to their workforce in a quick and reliable manner. However, when employers need to review or produce these communications, it is often difficult for employers to locate the specific communications sent to their workers and/or to prove that a specific worker actually received the communication on a specific date. It is also often difficult to verify the exact version/content of the communication that was sent to a specific worker on a particular date, especially when a communication, such as an workplace handbook, is subject to constant editing.

Accordingly, Document Systems in accordance with the invention permit employers to distribute communications to their entire workforce, specific individuals or groups of individuals. Document Systems in accordance with the invention permit employers to easily locate and retrieve all of the specific communications that were sent to their workforce and to prove which specific communications were received by which employees. It assists in creating and storing acknowledgments that documents were received and facilitates the location and retrieval of the exact communications.

In a preferred embodiment of the invention, certain users are assigned an Administrator role. Administrators can create and distribute Notifications in accordance with preferred embodiments of the invention. When an Administrator logs in to Document Systems in accordance with the invention, they land on their home screen 1500. When an Administrator selects Create New Document 1530, one of the options of drop-down menu 1531 is "Notification".

Figure 23:
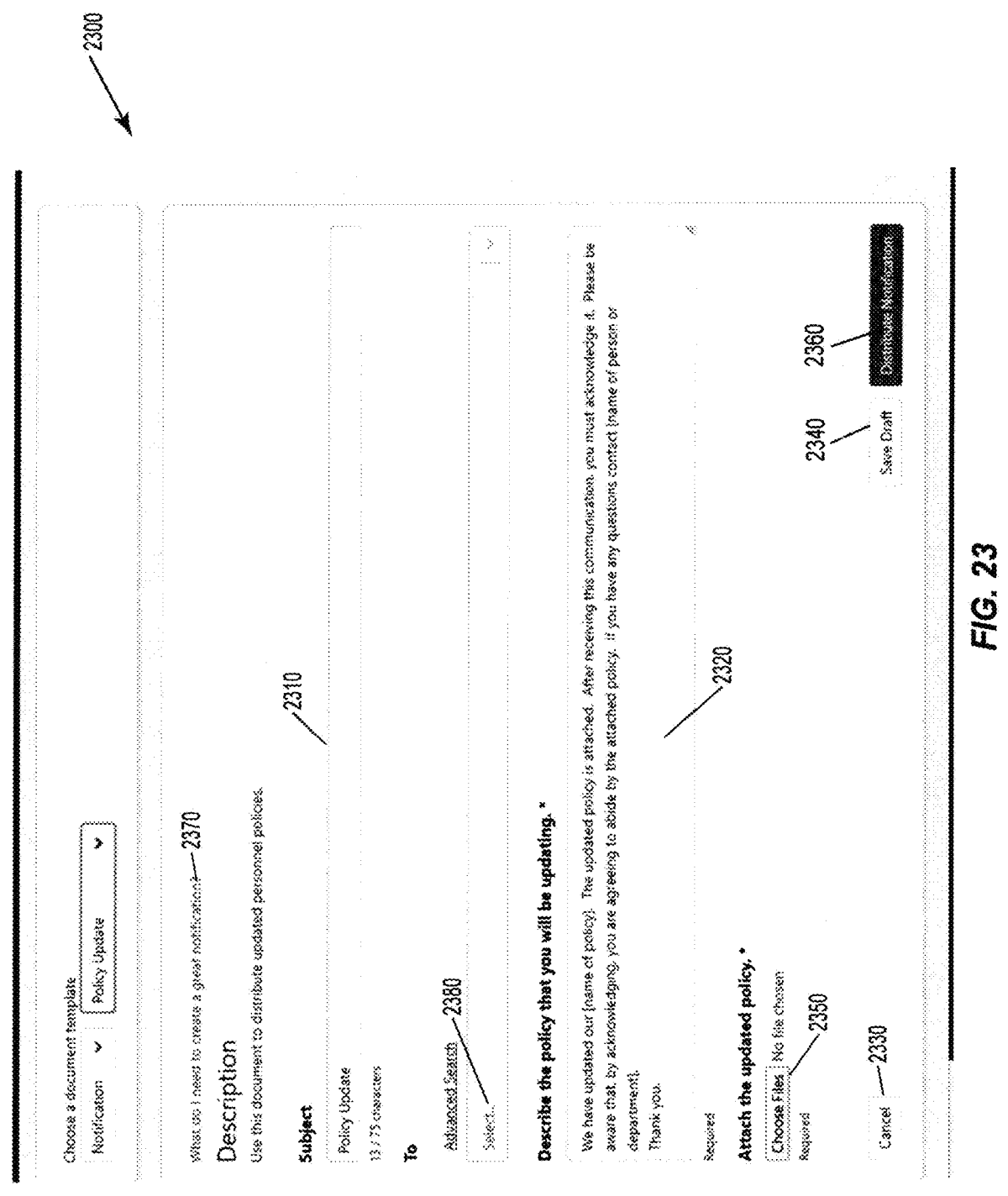

Document Systems in accordance with the invention can include different pre-established Notification templates for different types of notifications. If an Administrator selects "Notification" from menu 1531, they can be presented with another drop-down menu of different notification templates, similar to the function of drop down 1532. Examples include Document Distribution or Policy Update. A sample Policy Update template screen 2300 can be seen in FIG. 23.

Policy Update screen 2300 includes a subject region 2310 to describe the subject of the notification and a description area 2320 to describe the policy being updated. For example, this area can state that: "We have updated our Dress Code policy. The updated policy is attached. After receiving this communication, you must acknowledge it. Please be aware that, by acknowledging, you are agreeing to abide by the attached policy. If you have any questions, contact your department head. Thank you."

Notification template 2300 can also include a cancel button 2330 to delete the draft Notification, a save draft button 2340, a choose file button 2350 to attach the material to be distributed, and a Distribute Notification button 2360 to send out the update notification. Notification template 2300 can also include a tips hot-link 2370 to provide the Administrator general information about how to create an effective Notification. After naming the Notification, Administrators can create a distribution list of Document System Users who will receive the Notification by selecting from a drop-down 2380. In certain embodiments of the invention, Administrators can type in the name of individual Users they want to receive the Notification, from drop-down 2380. Administrators can also create a distribution list by filtering all Users, based on, for example, a user's name, email, geographic location, status (employee, contractor, supervisor, administrator, Reviewer, HR, HR Reviewer, Hotline Recipient). Each employer can also create customized fields, depending on the organization of a particular entity, such as "Department", "Overtime exempt status", "Training cycle" or "Region".

It might be necessary to send a Notification to only one particular geographic region of a multi-region company. For example, it may be that a particular state has passed legislation that will require a change to the company's sick leave or Sexual Harassment Prevention policy for workers employed in that state. The company may need to distribute a new policy to only workers in that specific region. Similarly, multinational companies might group their workers by country and want to use that as a designation to distribute information. An Administrator might select all of the Users in a particular department, category or region or click on individual users if not all of the users in a category or region require the Notification. A completed notification template will indicate the specific document or documents that have been attached, if any. When the notification is distributed, a record of the notification is created in the Document System platform and can be recorded on the Blockchain. The Document System platform assures that the notification is tamperproof and immutable, using known hashing and block chain technology.

Figure 23A:
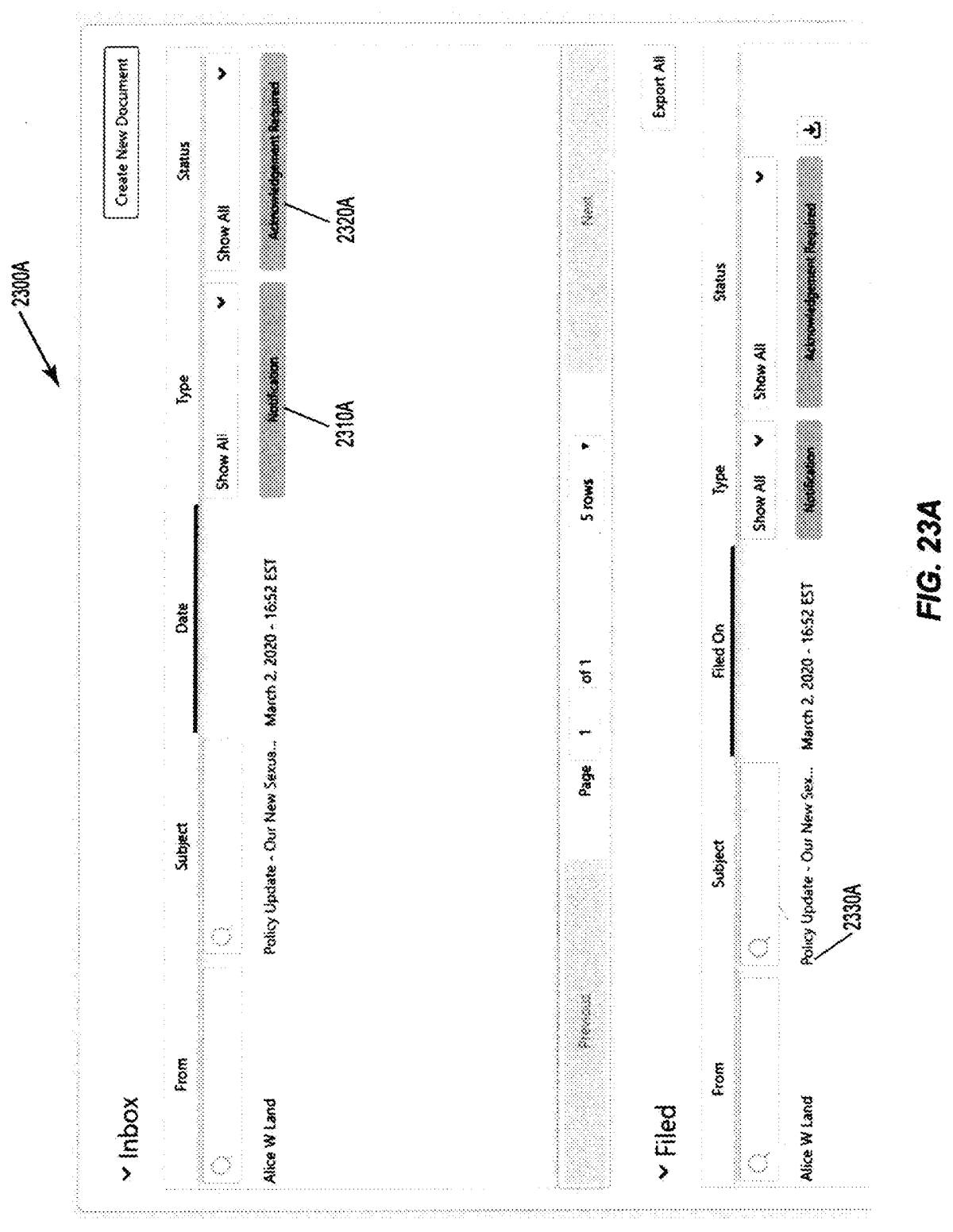
Figure 24:
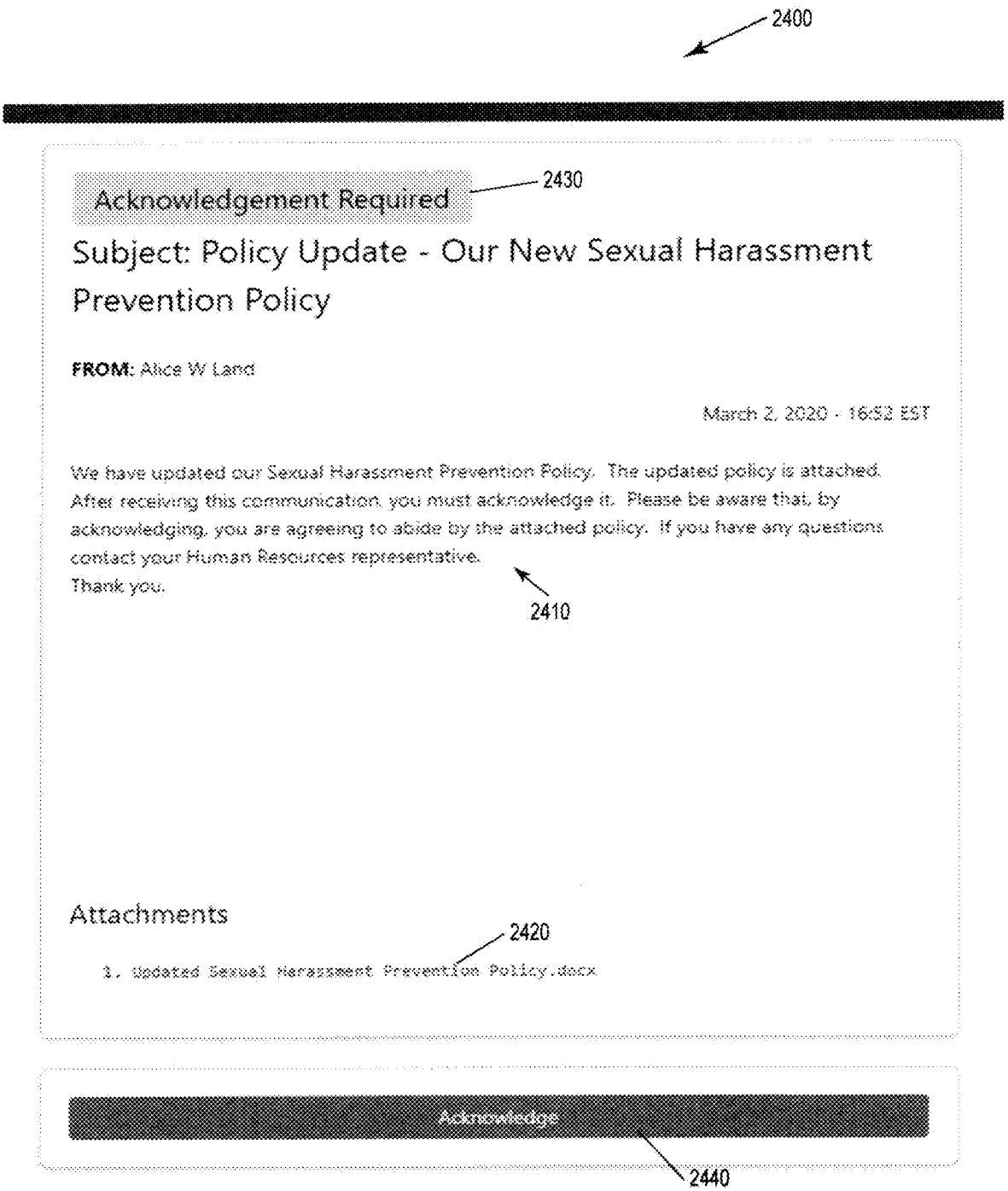
FIG. 24 shows an example of a notification window in accordance with an embodiment of the invention.

When an Administrator sends a Notification, the Document System platform sends an email to the identified recipients that a communication requires their attention. When Users log into their Document System platform, they will see a Notification that requires acknowledgement in their Inbox and a copy of that Notification in their Filed box. Even after acknowledgement, their Filed boxes will contain notifications that can be viewed or downloaded at that time or a later time. time. FIG. 23A shows an inbox 2300A of fictitious user Alice Land, with a Notification 2310A and a status of Acknowledgment Required 2320A. To acknowledge a Notification, the User must open the Notification in their Inbox by clicking on the Notification's Subject 2330A. This will open the Notification in a separate Notification Window 2400, shown in FIG. 24.

Notification window 2400 identifies the subject (Policy Update-Our New Sexual Harassment Prevention Policy); the name of the Administrator that distributed the policy, the date and time the Notification was sent (e.g., Mar. 2, 2020-16:52 EST); and an explanation 2410 of the update. This record will be permanent and immutably by use of known blockchain and hashing. Notification window 2400 will also include a link 2420 to the downloadable attachments. Notification window 2400 also includes an instruction 2430 that an Acknowledgment by the Recipient is required. Users can acknowledge receipt, by clicking on an Acknowledge button 2440.

Figure 25:
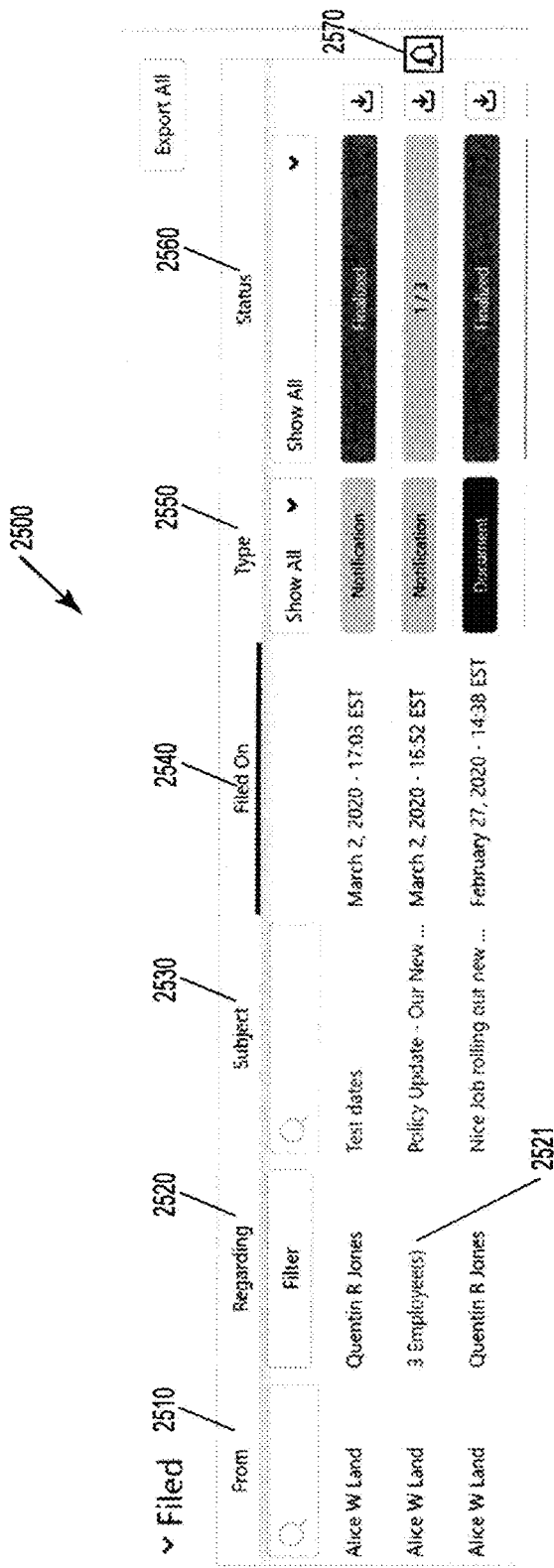
FIG. 25 shows an HR user's inbox in accordance with an embodiment of the invention.

After a User acknowledges receipt of the Notification, a record of the acknowledgment is created and associated with the finalized Notification. In preferred embodiments of the invention, Users who have been assigned HR credentials (HR Users) are able to see finalized communications for the entire workplace, in addition to specific communications they receive directly as Users. These communications can be accessed through a "Filed" window 2500 of an HR User's Inbox of the Document System, as shown in FIG. 25. Filed window 2500 includes a sender column 2510; a Regarding column 2520; a Subject column 2530; a Filed On column 2540; a Type column 2550; and a Status column 2560.

Figure 26:
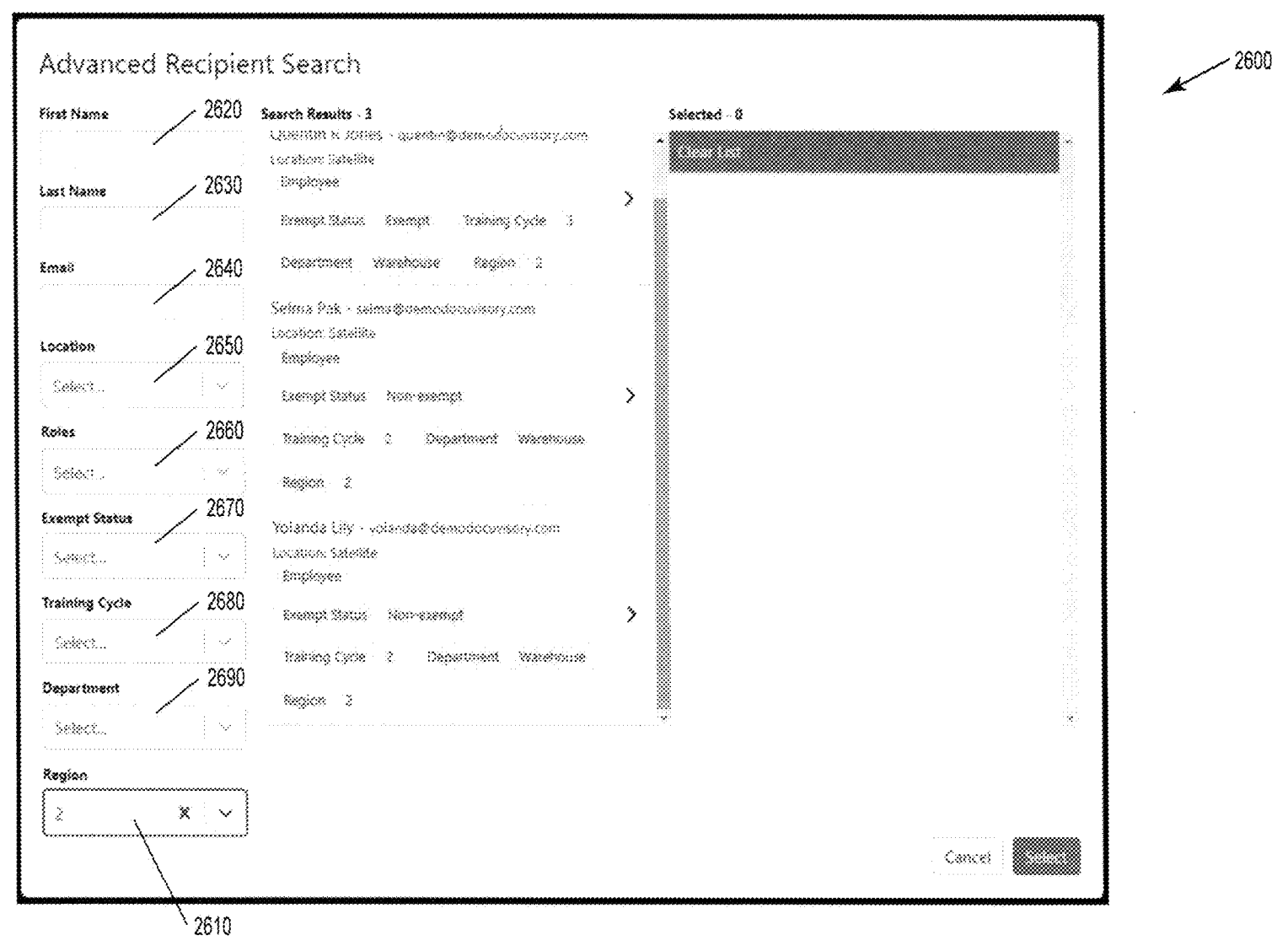

In preferred embodiments of the invention, an HR User can search for a document, such as a Notification that was distributed by using the filtering functions in their Filed box 2500. The HR User can filter searches by the type of communication, the name of the individual that created the communication or receive the communication, the subject of the communication, the filing date, or the status of the communication. The HR User can also click on the "filter" in the "Regarding" column to access an Advance Recipient Search tool and filter by the categories of Advanced Recipient Search window 2600, shown in FIG. 26. In this example, if the HR User is searching for a list of all Notifications sent to Region 2, they can click on the word "filter" in Regarding column 2520 and they could search Region 2 in a Region drop-down 2610. Alternatively, the Advanced Recipient Search can be conducted by a first name 2620; a last name 2630; an email address 2640; a location 2650; a role 2660; an exempt status 2670; a training cycle 2680; or a department 2690. If the search selection was for Region 2, the HR User would receive a list of all the communications sent to Users in Region 2.

In preferred embodiments of the invention, acknowledgement of Notifications can be tracked by the HR User's Filed box 2500. Whether a Notification has been acknowledged will be indicated in status column 2560. In screen 2500, only one of the recipients has acknowledged the Notification. In embodiments of the invention, if the HR User clicks on the entry in Regarding column 2520, which indicates 3 Employee(s) (2521), the list of the employees who received the Notification and whether they have acknowledged the Notification can be reviewed.

In preferred embodiments of the invention, a reminder email will be sent to Users each day, until the knowledge receipt of the Notification. If the HR User wants to send additional reminders, they can do so by clicking a "Remind All Acknowledged" button 2570 and the User will receive a new email directing them to address the communication in the Document System platform.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method of creating and storing a document using a computer network accessible by a plurality of computational devices operated by a plurality of human users that work for an organization as either employees or contractors of the organization, said human users holding roles in the organization including supervisors, initial reviewers, and human resource (HR) reviewers, the HR reviewers being individuals that perform human resources-related functions for the organization, the method comprising the steps of:

displaying a template having fillable text box portions to be filled out to create a draft document on a computational device of a supervisor of the organization, the supervisor authoring the draft document by inputting into the fillable text box portions of the template a description of work-related conduct describing what a specified worker of the organization for whom the supervisor is in a supervisory role did while working for the organization, said description using objective work-related specifics, including who, what, where, when or how of the specified worker's conduct the draft document containing information regarding the work-related conduct of the specified worker of the organization;

encrypting the draft document with a unique encryption key and storing the encrypted draft document on an assigned location within the computer network, then forwarding the encrypted draft document, via the computer network, to an initial reviewer of the organization;

(a) after receiving the encrypted draft document from the supervisor, the initial reviewer adding initial reviewer edits and creating a new encrypted draft document with initial reviewer edits, and then returning the new encrypted draft document with initial reviewer edits to the supervisor via the computer network;

(b) the supervisor rejecting the new encrypted draft document with initial reviewer edits, adding supervisor edits, and creating an encrypted new version of the draft document with supervisor edits, and then sending the encrypted new version of the draft document with supervisor edits to the initial reviewer via the computer network;

repeating steps (a) and (b) until both the supervisor and the initial reviewer indicate indicating on the computer network an approval of the encrypted draft document with the initial reviewer edits and the supervisor edits and then sending the encrypted draft document with the initial reviewer edits and the supervisor edits via the computer network to an HR reviewer;

(c) when the HR reviewer receiving the encrypted draft document with the initial reviewer edits and the supervisor edits, the HR reviewer rejecting the draft document with the initial reviewer edits and the supervisor edits and creating an encrypted HR reviewed draft document by adding HR reviewer edits and then sending the encrypted HR reviewed draft document to the supervisor via the computer network;

when the supervisor receiving the encrypted HR reviewed draft document, the supervisor either:

(d) indicating an approval on the computer network of the encrypted HR reviewed draft document and then sending the encrypted HR reviewed draft document via the computer network to the initial reviewer; or (e) adding edits and creating an encrypted supervisor revised version of the draft document with supervisor revisions, and then sending the encrypted supervisor revised version of the draft document with supervisor revisions to the initial reviewer via the computer network;

(g) the initial reviewer receiving:

(i) the encrypted HR reviewed draft document with the supervisor approval, and indicating on the computer network an initial reviewer approval, and then sending the encrypted HR reviewed draft document with the supervisor approval via the computer network to the HR reviewer; or (ii) the encrypted supervisor revised version of the draft document with supervisor revisions and indicating on the computer network an initial reviewer approval of the encrypted supervisor revised version of the draft document with supervisor revisions; and then sending the encrypted supervisor revised version of the draft document with supervisor revisions via the computer network to the HR reviewer:

(h) the HR reviewer indicating an approval of the encrypted HR reviewed draft document with the supervisor approval or the encrypted supervisor revised version of the draft document with supervisor revisions and then designating the HR reviewed draft document with the supervisor approval or the supervisor revised version of the draft document with supervisor revisions a finalized document;

after the designation of the draft document as the finalized document, (i) deleting all prior versions of the draft document and (ii) deleting the unique encryption key, rendering the prior versions of the draft document irretrievable and (iii) adding the finalized document to a blockchain network to create an immutable final document stored on the blockchain network.

2. The method of claim 1, wherein the initial reviewer indicating an approval of the encrypted new version of the draft document with the supervisor edits by clicking an approval button on the template, which causes the transmission of the encrypted new version of the draft document with the supervisor edits to an inbox of the HR reviewer.

3. The method of claim 1, wherein the document on the computational device of the supervisor is a performance review by the supervisor, of another worker of the organization, input into the fillable text box on the template by the supervisor.

4. The method of claim 1, and including sending an electronic notification to the initial reviewer that the inbox of the initial reviewer requires the initial reviewer's attention when the encrypted new version of the draft document with the supervisor edits is transmitted to the inbox of the initial reviewer.

5. The method of claim 1, wherein the fillable text box portions include text box space configured to receive text input and suggested language.

6. The method of claim 1, wherein the template includes a dropdown menu to select different types of documents.

7. The method of claim 1, wherein the template includes a dropdown menu to select from among a group of identified workers of the organization and a type of work-related information that will be a subject of the document.

8. The method of claim 1, wherein the template includes a button with which to attach a data file to the document.

9. The method of claim 1, wherein when the initial reviewer makes the new encrypted version of the draft document in step (a), sending an email to the supervisor to alert the supervisor of the new encrypted version of the draft document.

10. The method of claim 1, wherein forwarding the encrypted draft document to the initial reviewer including transmitting the encrypted draft document to an inbox of the initial reviewer, accessible by the computational device.

11. The method of claim 1, wherein the supervisor has the supervisory role in the organization company with respect to the organization's specified worker, and the information is the supervisor's performance review of the organization's specified worker.

12. The method of claim 1, wherein the work-related conduct describing what the specified worker of the organization for whom the supervisor is in a supervisory role does, input by the supervisor, is a performance review by the supervisor of the organization's workers.

* * * * *